(12) United States Patent
Varghese et al.

(10) Patent No.: US 10,114,733 B1
(45) Date of Patent: Oct. 30, 2018

(54) SYSTEM AND METHOD FOR AUTOMATED TESTING OF USER INTERFACE SOFTWARE FOR VISUAL RESPONSIVENESS

(71) Applicant: CADENCE DESIGN SYSTEMS, INC., San Jose, CA (US)

(72) Inventors: David Varghese, Kerala (IN); Mohit Saxena, Uttar Pradesh (IN); Anshul Sharma, New Delhi (IN); Arnold Jean-Marie Gustave Ginetti, Antibes (FR)

(73) Assignee: Cadence Design Systems, Inc., San Jose, CA (US)

( * ) Notice: Subject to any disclaimer, the term of this patent is extended or adjusted under 35 U.S.C. 154(b) by 159 days.

(21) Appl. No.: 15/249,974

(22) Filed: Aug. 29, 2016

(51) Int. Cl.
| | |
|---|---|
| *G06F 3/0481* | (2013.01) |
| *G06F 3/0484* | (2013.01) |
| *G06F 9/44* | (2018.01) |
| *G06F 11/36* | (2006.01) |
| *G06F 8/38* | (2018.01) |
| *G06T 7/40* | (2017.01) |

(52) U.S. Cl.
CPC ........ *G06F 11/3664* (2013.01); *G06F 3/0481* (2013.01); *G06F 3/04842* (2013.01); *G06F 8/38* (2013.01); *G06T 7/408* (2013.01); *G06T 2200/24* (2013.01); *G06T 2207/10024* (2013.01)

(58) Field of Classification Search
CPC ...... G06F 3/0481; G06F 3/04842; G06F 8/38; G06F 11/3664; G06T 7/408; G06T 2200/24; G06T 2207/10024

USPC .................................................. 717/124–135
See application file for complete search history.

(56) References Cited

U.S. PATENT DOCUMENTS

| | | | | |
|---|---|---|---|---|
| 6,293,251 | B1* | 9/2001 | Hemmerlein | F02D 41/222 123/357 |
| 6,301,517 | B1* | 10/2001 | Doran | G01R 35/00 324/750.01 |
| 8,466,859 | B1* | 6/2013 | Herz | G09G 3/3648 345/102 |
| 8,666,181 | B2* | 3/2014 | Venkatapuram | H04N 5/144 348/154 |

(Continued)

OTHER PUBLICATIONS

Cisco, "IP SLAs Configuration Guide, Cisco IOS Release 15M&T, Chapter: Configuring Proactive Treshold Monitoring for IP SLAs Operations," Mar. 31, 2015, last retrieved from https://www.cisco.com/c/en/us/td/docs/ios-xml/ios/ipsla/configuration/15-mt/sla-15-mt-book/sla_threshold_mon.html on Apr. 1, 2018.*

(Continued)

*Primary Examiner* — Andrew M. Lyons
(74) *Attorney, Agent, or Firm* — Rosenberg, Klein & Lee

(57) ABSTRACT

A benchmark test system captures and records root, or input, behavior from a user input device as one or more time-displaced samples of input. The system also separately captures and records the canvas, or visual, behavior of a user interface in response to the captured input as a series of time-displaced image frames. The image frames are analyzed for visual prompts occurring responsive to the input, and parameters of the image frames are determined. A parametric difference between corresponding ones of the root events and canvas responses is thereby computed, in order to determine a degree of visual responsiveness for the user interface software respective to the root input.

20 Claims, 12 Drawing Sheets

(56) References Cited

U.S. PATENT DOCUMENTS

| | | | | |
|---|---|---|---|---|
| 2002/0152431 | A1* | 10/2002 | Fleming | G06F 11/0757 714/47.2 |
| 2004/0233336 | A1* | 11/2004 | Zhu | H04N 5/144 348/700 |
| 2006/0025950 | A1* | 2/2006 | Childress | G06F 11/3409 702/92 |
| 2011/0050758 | A1* | 3/2011 | Chao | G09G 3/3611 345/694 |
| 2013/0197862 | A1* | 8/2013 | Uzelac | G06F 3/041 702/186 |
| 2013/0271638 | A1* | 10/2013 | Brown | H04N 5/23238 348/333.12 |
| 2013/0345864 | A1* | 12/2013 | Park | B25J 9/1612 700/248 |
| 2015/0106758 | A1* | 4/2015 | Boys | G06F 3/0484 715/771 |
| 2015/0169076 | A1* | 6/2015 | Cohen | G06F 3/04815 345/156 |
| 2015/0180933 | A1* | 6/2015 | Spracklen | G06F 17/246 715/740 |
| 2017/0132105 | A1* | 5/2017 | Deber | G06F 11/3041 |

OTHER PUBLICATIONS

He et al., "Video-Based Measurement of System Latency," International Immersive Projection Technology Workshop, 2000, last retrieved from https://www.evl.uic.edu/documents/latency_ipt2000.pdf on Apr. 2, 2018.*

Pantels et al, "Touch Response Measurement, Analysis and Optimization for Windows Applications," Intel, 2014, last retrieved from https://software.intel.com/sites/default/files/managed/85/c5/Touch_Response_Optimization_for_Windows_Apps.pdf on Apr. 1, 2018.*

Rajamony, Ramakrishnan and Elnozahy, Mootaz, "Measuring Client-Perceived Response Times on the WWW," 2001, last retrieved from http://citeseerx.ist.psu.edu/viewdoc/download?doi=10.1.1.69.7329&rep=rep1&type=pdf on Apr. 1, 2018.*

StackExchange, "How to measure UI lag on computer?" in particular the "Desktop applications" section of the answer by "jqp" on May 30, 2012, last retrieved from https://ux.stackexchange.com/questions/21951/how-to-measure-ui-lag-on-computer on Apr. 2, 2018.*

Zeldovich, Nickolai and Chandra, Ramesh, Interactive Performance Measurement with VNCplay, Stanford University, 2005, last retrieved from https://suif.stanford.edu/vncplay/freenix05.pdf on Apr. 1, 2018.*

G. Bae, G. Rothermel and D. Bae, "On the Relative Strengths of Model-Based and Dynamic Event Extraction-Based GUI Testing Techniques: An Empirical Study," 2012 IEEE 23rd International Symposium on Software Reliability Engineering, Dalas, TX, 2012, pp. 181-190. (Year: 2012).*

X. Yuan, M. B. Cohen and A. M. Memon, "GUI Interaction Testing: Incorporating Event Context," in IEEE Transactions on Software Engineering, vol. 37, No. 4, pp. 559-574, Jul.-Aug. 2011. (Year: 2011).*

* cited by examiner

SYSTEM AND METHOD FOR AUTOMATED TESTING OF USER INTERFACE SOFTWARE FOR VISUAL RESPONSIVENESS

BACKGROUND OF THE INVENTION

The subject system and method are generally directed to the automated testing of user interface software.

User interface software serves as a means of supplying input from a user to core software on the "back end," and of supplying output from the core software to the user. An important feature of user interface software is the speed at which the interface visually responds to input, by rendering a visual prompt in the interface. Time lag in presenting an accurate visual prompt might confuse a user into thinking the input was not completely received or accepted. The user might also, when providing rapid input, lose track of what input has been provided if the visual prompts fail to maintain speed with the input. Ideally, this time lag should be reduced to the point where a user will not perceive it, but this cannot be done without first becoming aware of the time lag through quality assurance or other suitable testing.

Presentation of a visual prompt is dependent not only on the processing of the input with the core software, but also on the user interface itself, which may be slow to render the visual prompts due to its own software code. Existing automated quality assurance tests for software can detect speed issues in the former but not the latter, even though the user interface may be the source of an issue. In particular, existing automated tests have no adequate means to test whether "transitional responses" of such a prompt follow continuous input, such as location input in motion, in a clean, "smooth" manner. Testing the speed of the user interface itself is therefore typically done in a manual fashion, which tends to be expensive, slow, and imprecise.

There is therefore a need for an automated user interface test that can determine whether the user interface's visual performance meets predefined benchmarks.

There is also a need for said automated user interface test to evaluate time lag in visually presenting a response.

There is also a need for said automated user interface test to evaluate lag in visually maintaining a minimum distance between an input location and a response location over time.

There is also a need for said automated user interface test to produce testing results reflective of a real user experience providing real input to the user interface.

There is also a need for said automated user interface test to reproduce the testing results in a consistent manner.

SUMMARY OF THE INVENTION

It is an object of the disclosed system and method to automatically quantify a degree of visual responsiveness of a user interface in response to inputs.

It is another object of the disclosed system and method to automatically determine whether said degree of visual responsiveness meets a predefined performance benchmark.

These and other objects may be attained in a system and method for automated testing of user interface software for visual responsiveness. While not limited thereto, a disclosed embodiment is directed to a system for testing user interface software for time lag in actuating a visual prompt responsive to user manipulation of a user input device.

In certain embodiments, the system includes a root capturing unit executable to capture user actuation of the input device as at least one root event. Each root event may be captured as a series of time-displaced samples of input device actuation. The system includes a canvas capturing unit executable to capture a processing of the root event by the user interface software as a canvas response. The canvas response may be captured as a series of time-displaced image frames. The system also includes a test analysis unit coupled to said root and canvas capturing units. Said test analysis unit may be executable to determine a parametric difference between corresponding ones of the root events and canvas responses, and to determine a degree of visual responsiveness for the user interface software based thereon.

While not limited thereto, another disclosed embodiment is directed to a benchmark test system for testing user interface software for time lag in actuating a visual prompt responsive to user manipulation of a user input device.

In certain embodiments, the system includes an input event recorder executable to record user actuation of the input device as at least one input event. Each input event may be recorded as a series of time-displaced samples of input device actuation. The system also includes an interface response recorder executable to record a processing of the root event by the user interface software as an interface response. The interface response may be recorded as a series of time-displaced image frames. The system also includes a test analysis unit coupled to said input event and interface response recorders. Said test analysis unit may be executable to compute at least one of a response time difference and a response distance between corresponding ones of the input event samples and interface response image frames, and to determine a degree of visual responsiveness for the user interface software based thereon.

While not limited thereto, yet another disclosed embodiment is directed to a method of testing user interface software for time lag in actuating a visual prompt responsive to user manipulation of a user input device.

In certain embodiments, the method includes recording user actuation of the input device as at least one root event. Each root event may be recorded as a series of time-displaced samples of input device actuation. The method also includes recording a processing of the root event by the user interface software as a canvas response. The canvas response may be recorded as a series of time-displaced image frames. The method also includes computing a parametric difference between corresponding ones of the root events and canvas responses. The method includes determining a degree of visual responsiveness for the user interface software based upon the parametric difference.

Additional aspects, details, and advantages of the disclosed system and method will be set forth, in part, in the description and figures which follow.

DETAILED DESCRIPTION OF THE PREFERRED EMBODIMENTS

Figure 1A:
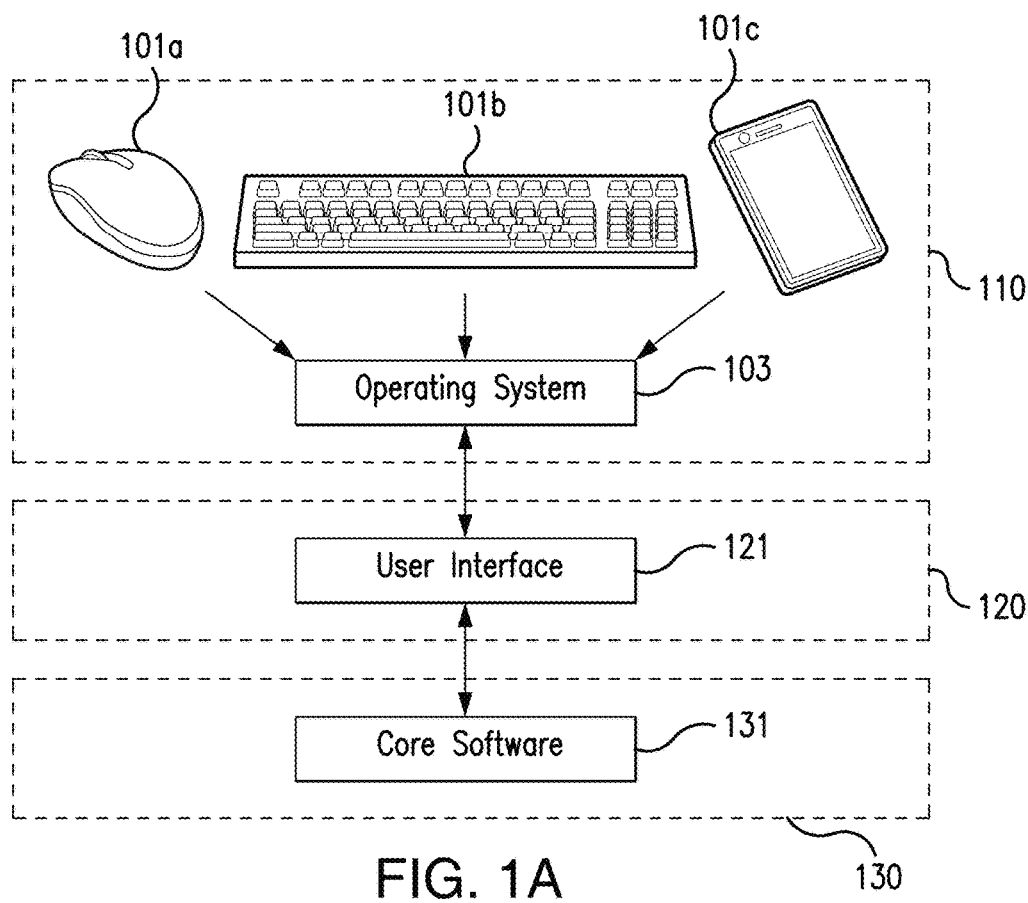
FIG. 1A is a relational chart illustrating three levels of computer activity and their interaction.

Reference will now be made in detail to exemplary embodiments, which are illustrated in the accompanying drawings, wherein like reference numerals refer to the like elements throughout. The embodiments are described below in order to explain the disclosed system and method by referring to the figures.

Section headings are included in this Detailed Description. It is noted that these section headings are for convenience only and should not be interpreted as limiting the scope of the claimed invention in any way.

A user interface may be slow either to generate an initial visual prompt responsive to user input, or to maintain correspondence between the visual prompt and the user input. To quantify the degree of responsiveness, to determine whether this responsiveness meets a minimum performance standard, or benchmark, and to reproduce these determinations, the input is captured, recorded, and replayed at a "root" level separate from the user interface, as one or more input events. The visual response to the input within the user interface is captured and recorded at a "canvas" level, as a series of images reflecting the visual content of the user interface.

The series of images are preferably captured and recorded in a manner similar to that of a film camera; that is, at rapid and regular intervals. With a sufficient number of frames captured per second, the individual image frames are reflective of the visual activity of the user interface as it would appear to a user, just as a sufficient number of film frames visually simulates the movement of the action being recorded. Therefore, an image analysis of these image frames, while reduced significantly in complexity from an analysis of all visual activity of the user interface, will still identify and quantify any time lag issues perceptible to a user.

An image analysis therefore determines parameters of the image frames, such as the presence, timing, or location of a visual prompt, the visual prompt in response to an input event, such as for example a mouse click, keystroke, or the like. The parameters are then compared with those of corresponding input events, and a parametric difference between the image frames and the input events is computed, which is in turn used to determine a degree of visual responsiveness. As one example, the timing of an input event is compared to the timing of a visual prompt resulting from that input event, and the parametric difference is a time elapsed between the two, according to a time parameter of the image frame first containing the visual prompt. As another example, a coordinate location of an input event is compared to a coordinate location of a visual prompt resulting from that input event, and the parametric difference is a coordinate or pixel distance between the two, according to the image frame corresponding in time to the input event. Other parametric differences may also be computed or otherwise determined to quantify other ways by which the visual prompts are responsive or unresponsive to the user inputs.

More specific embodiments of such a system and method are described further herein.

1. Levels of Software

Figure 1B:
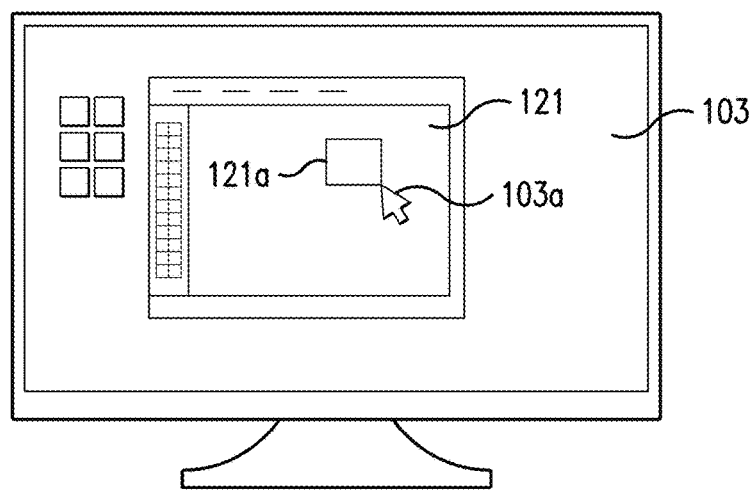
FIG. 1B is an example depiction of elements of the levels of FIG. 1A in a computer display.

FIG. 1A is a chart depicting three levels of computer activity and their interaction. FIG. 1B is an example depiction of elements of these levels in a computer display.

As used in this description, the term "root" refers to activity at the operating system level. Root activity, at a root level 110, includes input from a user input device, which may be a mouse 101a, keyboard 101b, or touch pad 101c, among other possibilities. Root activity also includes the movements of an operating system cursor 103a, and may further include other operation and behavior of the operating system 103, both displayed and undisplayed.

As used in this description, the term "canvas" refers to the information and graphics rendered by a user interface for a software system. Canvas activity, at a canvas level 120 between the root and back end levels 110, 130, includes anything displayed both by and in the user interface 121, such as visual prompts 121a or other information. Canvas activity does not include the operating system cursor 103a or its movement activity; although the cursor may be in the same space as the user interface 121, as depicted in FIG. 1B, it is not being rendered by or controlled through the user interface 121, but by and through the operating system 103. Canvas activity also does not include any behavior of underlying core software 131 of the software system, but only the results of this behavior to the extent that the user interface 121 interprets and presents said results.

As used in this description, the term "back end" refers to non-interface processing activity of the software system in response to user input. Back end activity, at a back end level 130, includes the activity of the software system core 131, which might best be described as any elements of the software system not directly concerned with rendering the user interface 121. As but a few examples, the core 131 might include functions for file conversion or printing, which would generally only be reflected in the user interface 121 with notices about progress and completion; the core 131 might also include functions for data entry, the output of which would be reflected continuously in the user interface 121, but which includes formatting and storage operations that the user interface 121 does not itself perform.

Depending on the design of the software system, there may not be a clear delineation between the canvas level 120 and the back end level 130, but in all cases anything that is visually presented by the software system to a user by a display is so presented by the canvas level 120. Automated operation, including automated testing, may therefore sometimes bypass the canvas level 120 and provide input directly to the back end level 130, as an automatic, non-human system has no need of visual interaction and therefore no need to consume the additional processing resources necessary for a user interface 121.

Generally, input from the root level 110 is provided to the canvas level 120, which is preferably but not necessarily reflected by a visual prompt in the user interface 121 to indicate that the input was received. The canvas level 120 also interprets the input in the context of the user interface 121, and in most cases provides the interpreted input to the back end level 130. The core software 131 processes the interpreted input, and then in most cases provides the output of this processing back to the canvas level 120. The canvas level 120 then interprets and presents the output as visual information; this visual information may double as the visual prompt described above. The canvas level 120 therefore manages an interaction between a user and the back end level 130.

It is noted that the user interface 121 may render visual prompts 121a either with or without the involvement of the back end level 130. As but one example, a checkbox in the user interface 121 may be activated according to a user input from the root level 110. Responsive to the activation, the user interface 121 may do any of the following, depending on the function of the checkbox and other software design concerns: interpret and send the input through to the back end level 130 and await a response from the back end level 130 before rendering a check mark in the checkbox; interpret and send the input through to the back end level 130 but then render the check mark in the checkbox before receiving a response; instantly render a check mark in the checkbox and then interpret and send the input through to the back end level 130; instantly render a check mark in the checkbox without sending any input through to the back end level 130 at all (this last may be best if the checkbox is only concerned with other behavior of the user interface 121, such as, for example, a "full screen" selection box).

When input is provided to a software system, the software is perceived to be slow if the user interface is delayed in providing or updating a visual prompt in response to the input at the root level. This delay, or time lag, can be the result of various factors, which include but are not limited to:

The machine on which the software system is installed is slow due to hardware, the operating system, or other active processes.

The software system requires data or resources that are unavailable or delayed, such as license information, cloud data, or a remote server connection transmitted over a slow network.

The input is large or complex, or several inputs are received in a rapid manner (a "performance intensive" input), burdening the processor due to a large amount of back end activity.

The software code in the core software is inefficient for the requested function.

The software code in the user interface, or the manner in which this code interacts with the back end level, is inefficient for the requested function.

It is the last of these factors that this invention and its embodiments are primarily concerned with, as existing automated tests are unable to detect a time lag which is specifically within the interface, or canvas level. Existing automated testing methods frequently bypass the canvas level partially or entirely, and therefore the behavior of the user interface as it would appear to a user is not simulated. Rather, these tests determine the total time from input to completion of a command, which may not correlate to the canvas level behavior and in particular the generation of visual prompts. Additionally, no existing automated testing methods replicate both the root level and canvas level activity as they would exist for a user, and therefore cannot determine whether the canvas level shows a time lag relative to the root level.

Therefore, embodiments of the invention as disclosed below separately capture and record the root and canvas levels of operation for comparison, and compare activity on the two levels to compute or otherwise determine a parametric difference between the two, to determine the degree of visual responsiveness of the user interface software to the input.

Among the numerous fields where the subject system and method find highly useful application is the field of electronic design automation (EDA). In an EDA circuit design and/or layout system, for example, users may face particularly intense time lags due to such lag factors noted above. Various EDA tools typically manage an enormous and complex amount of data, even before components are placed into a circuit design, as they contain templates for numerous available components with parameters for each, as well as rules for placement and connection, among many other EDA features, and all these features must be accessible promptly from local or remote storage. Additionally, once a circuit design has been partially or completely built, these challenges are compounded by maintaining and tracking large numbers of placed components in response to the placement or alteration of a new component, where a change to certain components may affect other components according to numerous relational rules. Importantly, when these changes are rendered in a user interface, time lag for said rendering is not only frustrating to a user, but can lead to errors in input (as but one example, placement of a component where the core software currently understands it to be, rather than where the user interface currently displays it) that may be difficult to identify for correction among numerous other components. It is therefore important that any source of time lag in an EDA tool be properly identified for reduction or elimination.

Therefore, here and elsewhere in the description, occasional reference will be made to embodiments where an EDA tool provides both the user interface 121 of the canvas level 120 and the core software 131 of the root level 130. However, the invention and its embodiments are by no means limited to EDA tools, but have applications to any software system with a user interface rendered on a display, also including but not limited to visual editing tools, collaborative software, and such other applications requiring visual responsiveness to inputs or other control prompts.

2. Root Level and Input Event Recording

Input provided by a user is sometimes, in the art, referred to as an input "event." An input event is any actuation of an input device; it may be a mouse click or movement, a keystroke on a keyboard, or a tap or swipe on a touch screen, among other possibilities. Some forms of input, in particular continuous input such as movement, may be treated not as a single event but as a series thereof; as an example, a continuous mouse movement from a first location to a second location might be treated as a series of shorter movements between several intermediate locations.

Input events may be captured at the root level and recorded for replay in an emulator for analysis. Methods of doing so are known in the art, one example of which is the Xtrap X server extension for UNIX, although the invention is not so limited, as others are also available or may be uniquely implemented in certain embodiments of the invention. Preferably, the input event capture operation is activated, and then all inputs are captured and recorded until the operation is deactivated.

Input may be recorded as a series of time-displaced input "samples," each sample reflecting parameters of the present input at a particular time. Samples need not correspond one-to-one with distinct input events, but may be pieces of ongoing or continuous input events such as movement, broken down at regular intervals for easier analysis. However, for convenience, input "samples" and input "events" will be treated interchangeably hereinafter except where it is noted that the distinction is relevant.

An input event as recorded preferably includes the type of input, such as "keystroke combination: shift+g" or "mouse click: left mouse button," and a time stamp or other time parameter to indicate the time of the input, either in absolute terms or relative to the activation of the event capture operation. The time parameters of the various recorded events therefore indicate a time displacement between each input event.

An input event as recorded may also include a coordinate location of the input, if relevant to the input; if the input involves movement, the event as recorded preferably includes at least both the starting and ending points. Coordinate locations are preferably recorded in terms of the root level display, for consistency between events, as different input devices may have very different means of supplying what will be interpreted as the same location data at the root level.

Again, some inputs may be broken into a series of input events, or alternatively into a series of input samples, and these events or samples as recorded each include their own time, location coordinates, and other parameters. For example, a continuous mouse movement from an initial location to a final location over a second or more may be recorded as a first mouse movement from the initial location to a first intermediate location, starting at a time T; a second mouse movement from the first intermediate location to a second intermediate location, starting at a time T+0.1 seconds; and so forth until the final location. These individual samples of the mouse movement, taken at selected times, may then be reconstructed into the complete, continuous mouse movement later. (It may be more convenient to record only a single location at the time of each sample, instead of a "start" and "end" location for each sample, as each starting location would duplicate the ending location of the previous sample.)

Recorded input events can be played back, again at the root level, using a replay emulator. Several such emulators are known in the art including, again, the Xtrap X server extension for UNIX, although the invention is not so limited. By recording the input actions of a user as a set of input events or input samples, these inputs can be duplicated with precision as needed in the replay emulator. Therefore, an automatic test employing such a recording will perfectly duplicate the root level activity of the original test, as a time-displaced series of inputs, with each run of the test.

Additionally, the root level activity at any moment of the test can be determined by searching in the set of recorded input events for the event, or recorded sample of an input, having the corresponding time parameter.

3. Canvas Level and Visual Response Recording

The present visual content of a display, at the canvas level, may be captured and recorded through any number of "screen capture" operations known in the art, such as the WD operation in Unix, although the invention is not so limited, as others are also available or may be uniquely implemented in certain embodiments of the invention. The screen capture record takes the form of an image file or image frame which duplicates the appearance of the visual content of the display at the moment of the screen capture. A physical display is not required for the vast majority of these operations, as a processor may be configured to render the visual content even in the absence of a display on which to present the content, and the capture operation may intercept the content upon its rendering.

The screen capture operation, by itself or in combination with other software such as a script, may allow for automatic, repeated, regular capture of the visual screen content. A capture of image frames from the display at a set rate generates the equivalent of a motion picture film, where each image frame is a frame of the film; if the image frames are displayed in sequence at the rate of capture, it may simulate the visual behavior of the user interface in motion as a user would perceive it. The individual frames may therefore represent "what the user sees" to an automated analysis.

Motion pictures are commonly filmed at between 24 and 30 frames per second, and computer displays can render images at even faster rates. However, a screen capture operation activated 24 times a second or more may slow a computer processor and generate time lag that would not otherwise be present, foiling the intent of the performance test. Empirical research has determined that 7 to 12 captures per second, using common screen capture operations, will increase the time lag only negligibly in most computers, yet will still generate a "film" that will sufficiently simulate human perception for the purposes of the embodiments that follow. A more processor-efficient screen capture operation, or more efficient computer hardware, may be able to operate at higher speeds and improve this capture rate, correspondingly improving the precision of the testing.

Each captured image frame preferably has an associated time parameter representing the time it was captured and recorded, either in absolute terms or relative to the first screen capture operation. Although each captured image frame may have a time of capture explicitly associated with it in a memory, it is noted that the regular rate of capture means that the associated time of any frame may be extrapolated if the order of capture is known.

The majority of existing screen capture operations do not capture the location of the operating system cursor, which is managed at the root level. The captured image frame therefore displays the user interface, and all canvas level activity thereon, but lacks a visual representation of the operating system cursor. Additionally, the screen does not show if or when an input event such as a mouse click occurred, but only whether the user interface has responded to the event by rendering a visual prompt. However, for any time within the duration of the test, the location of the root cursor, and the other aspects of any input events, may be determined by searching in the set of recorded input events for the input event or input sample having the corresponding time parameter. This input may then be checked against the image frame having the same corresponding time parameter, and against the image frames corresponding to later times, to determine whether the visual response to an input was timely and accurate within a threshold.

It is noted that the timing of the recorded image frames may not precisely align with the timing of the recorded input events or event samples. In such cases, it is sufficient for an image frame to be closest in time to the input event out of all the recorded image frames, or alternatively for the input event to be closest in time to the image frame out of all the recorded input events, in order to state that the input event and the image frame "correspond" to each other in time for the purposes of this description.

4. Types of Time Lag

Time lag within a user interface may present as one or more of the following issues, among others:

A command initialization issue: When a user input activates a particular command, the initial visual prompt which should indicate the command takes excessive time to appear in response to the user input. That is, there is a time difference between provision of the input at the root level and the interface's response at the canvas level. As two examples, when a user inputs a keystroke on a keyboard while using a word processor, the typed character does not appear promptly; or, when a user clicks on a user interface checkbox using a mouse, the checkbox does not visually activate. This is especially common for the first use of the command after the user interface is opened, as it is often caused in part by the code and/or data necessary to create the visual prompt taking time to load into memory.

A command smoothness issue: When attempting to run a continuous command through a continuous user input, the visual prompt falls behind the input and needs extra time to "catch up." For instance, when the command involves motion, there is a location difference, or distance on the display, between the location data of the input and the location data of the interface response; if a user clicks and "drags" with a mouse input to select a series of objects, the selection prompt does not follow the mouse consistently to highlight all the objects. This form of smoothness lag may be more specifically termed "motion lag." Smoothness lag may also appear when typing text—the latest text to appear may be several characters behind the latest keystroke—or when selecting options rapidly—either the selected checkboxes, the response in the canvas to the selected option, or both are delayed—among other possibilities. Smoothness lag is still ultimately the result of a time lag, as it is caused by delays at the canvas level in responding to each moment of the input; the interface code cannot be processed as fast as the input is provided.

A command completion issue: When attempting to finish a command through a user input, the final visual prompt reflecting completion of the command takes excessive time to appear in response to the user input. Again, there is a time difference between provision of the input at the root level and the interface's response at the canvas level. For example, when a user "drags" an object with a mouse input and then releases the mouse button, the object is not promptly re-rendered in the new location. This is more likely to be the result of a delay at the back end level, as it frequently indicates delays in processing the input into output, or storing the input or output to a local memory, both of which are within the realm of the core software.

Some existing automated tests can detect lag in command completion, by testing the time from input to the generation of the resulting data in memory. Depending on how the test defines and detects the input, the test may determine the actual command completion lag, but more commonly determines the presence of a combination of all three types of lag—that is, the time from when an input is provided to when a corresponding command completes—with no ability to distinguish between the three types. Additionally, no existing testing solution can test for or determine lag in command initialization or smoothness.

However, embodiments of the present invention may test for both initialization lag and smoothness lag, as described herein. In combination with known methods to determine the combined lag, these embodiments may determine the completion lag simply by accounting for the initialization and smoothness lags when determining the combined lag.

It is noted that the invention is not limited to the following embodiments, but may also include embodiments detecting and quantifying these forms of lag in other ways, or other forms of lag entirely.

5. Embodiment to Detect Initialization Lag

By noting the time of a user input which should trigger an initial visual prompt in a user interface, detecting said initial visual prompt in the user interface, and computing or otherwise determining the time elapsed between, the visual responsiveness of the user interface as related to a command initialization may be quantified in an automated fashion. One method for doing so will now be described in detail.

Figure 2:
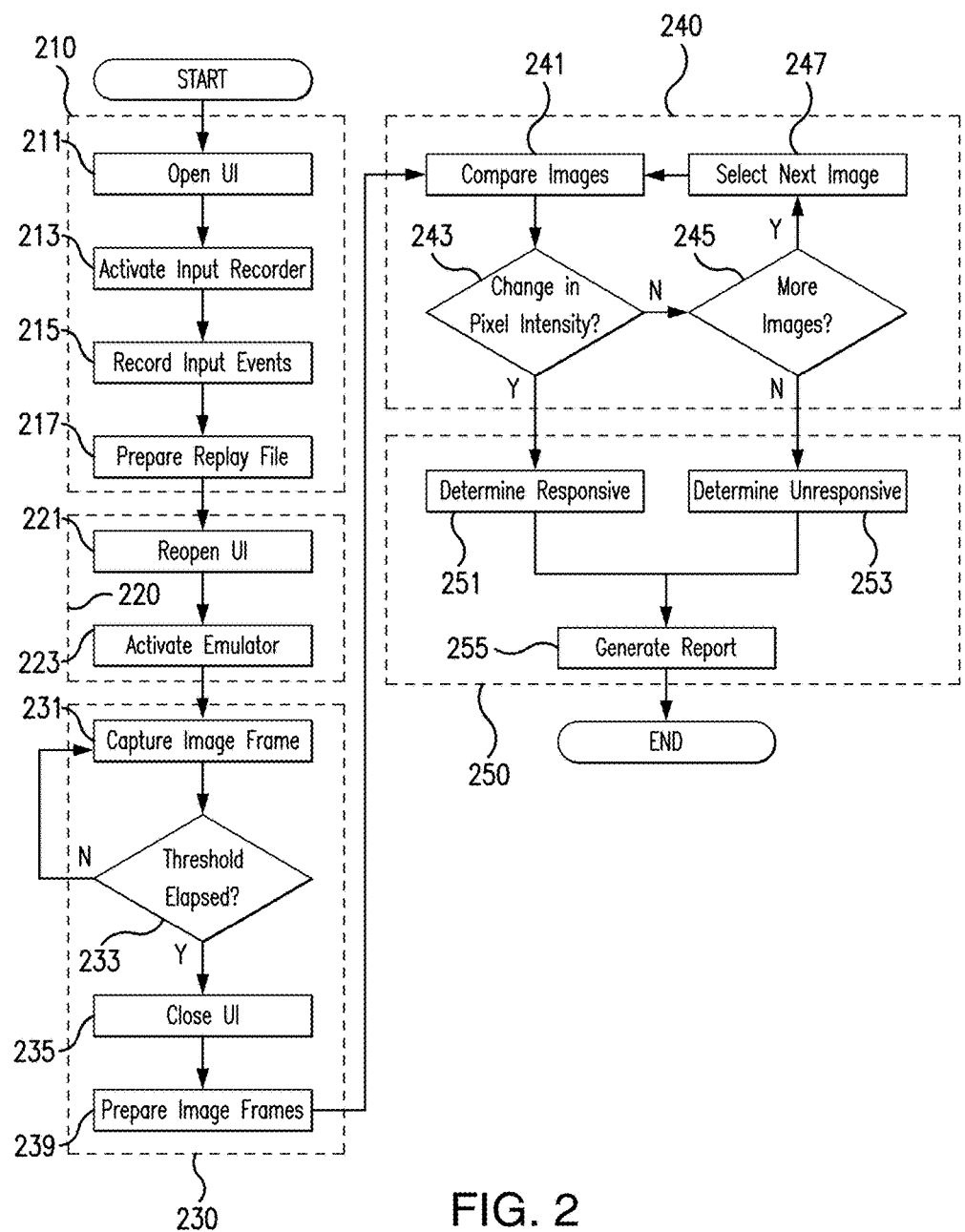
FIG. 2 is a block flowchart illustrating a method of determining a degree of visual responsiveness of user interface software in initializing a command, in accordance with an exemplary embodiment of the present invention.

FIG. 2 is a flow chart depicting a method of determining a degree of visual responsiveness of user interface software in initializing a command, according to an exemplary embodiment of the invention. Summarized, this method determines whether a visual prompt appears in response to input before a predefined time threshold elapses and, if so, how quickly.

During an input recording stage 210, the test is prepared by opening the user interface at 211, activating an input event recorder (also called a root capturing unit) at 213, and providing one or more input events to the user interface for capture and recording at 215. As but one example, an input event in the user interface of an EDA tool may be the use of a wire draw command, by using a mouse input device to click on a design canvas of the user interface and thereby initialize the appearance of the wire. The input event recorder may be of the types and operation described above, or of some other type. Because the test is for command initialization, the inputs are preferably limited to those necessary to initialize the command, which may be a single keystroke or mouse click.

The input events as recorded may already be in a format sufficient for replay by an input emulator. If they are not, or if additional surrounding instructions for the emulator are necessary, a complete replay file is prepared at 217, which includes the recorded input events in the proper format. In particular, the replay file may also include inputs to the user interface recorded in a more traditional manner, which will not be tested for responsiveness but are necessary to set up the user interface for the test. Irrelevant or undesired input events, such as inadvertently-bumped keys or unnecessary pauses in the input, may also be removed from the replay file during its preparation.

The input recording stage 210 need only be conducted once as described, and the resulting replay file or recording may be used for an unlimited number of tests involving remaining stages 220, 230, 240, and 250, which are described below.

Now that a replay file or event recording is prepared, a test initialization stage 220 may begin. Because command initialization lag is likely to be at its worst for the first use of the command, preferably, the user interface is activated immediately before testing the command in question, at 221. In this manner, the code and/or data necessary to create the visual prompt for the command will not be preloaded into memory and a worst case scenario may be tested.

An input emulator is then activated at 223 and configured to replay the recorded events from input recording stage 210, as well as any additional instructions of the replay file if one exists. The opening of the user interface at 221 may in some embodiments be an additional emulator instruction included in the replay file at 217, and therefore will run during this operation.

With the emulator replaying the recorded events, a canvas capturing stage 230 immediately begins, as an interface response recorder (also called a canvas capturing unit or screen capturing unit) captures an image frame from the canvas at 231. This screen capturing unit may be of the types and operation described above, or of some other type. Preferably, this initial image frame is captured at the moment of, or right before, the recorded event is replayed. The initial image frame therefore displays the canvas before the user interface can render a response to the input event. Preferably, a time of capture or an order of capture is associated with the image frame.

A benchmark or threshold time establishes a time duration within which the interface should respond to the input event, preferably reflective of whether the delay would be commented on by a user. This threshold time is predefined for the test no later than the completion of the emulator configuration at 223, and is preferably selected prior to the start of the method at 211. Each set of input events to be tested may have its own threshold time, or a general threshold time may be set. Empirical research and polling of human users has suggested that a response time greater than one second is intolerable for a user for any input, and therefore the threshold time for any set of input events is preferably set to one second or lower. If the interface does not respond before the threshold time elapses, the interface is unresponsive; that is, below a benchmark responsiveness.

At 233, it is checked whether the threshold time has elapsed. If not, the flow returns to 231 to capture an additional image frame. If the threshold time has elapsed, however, the loop ends. Preferably, the user interface is closed at this time, at 235.

The image frames may be prepared for analysis at 239 before moving to the next stage. For instance, if the expected visual prompt is not dependent on color for contrast against the user interface, the image frames may be converted to grayscale. The grayscale will both simplify the computations that will follow and will conserve storage space for the image frames.

Figure 3A:
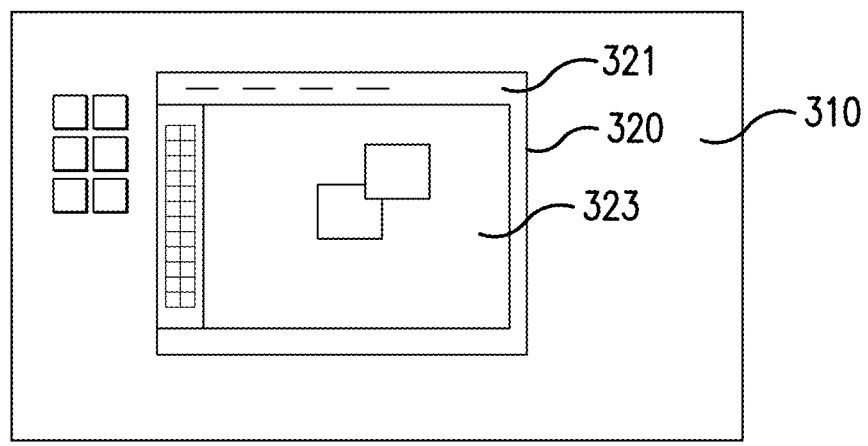
FIG. 3A depicts an example image frame captured as part of the method of FIG. 2.
Figure 3B:
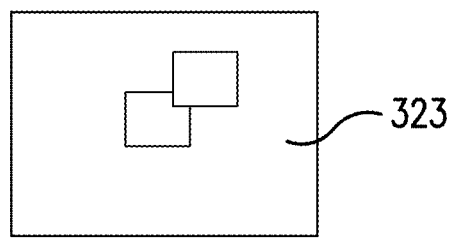
FIG. 3B depicts the example image frame of FIG. 3A after a cropping operation of the method of FIG. 2.
Figure 3C:
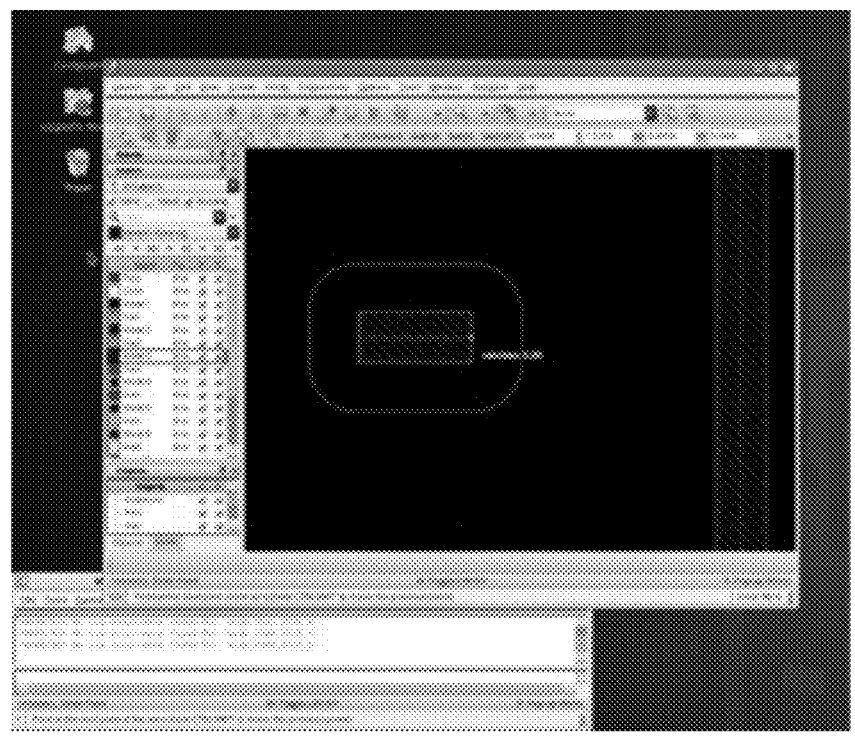
FIG. 3C is a reproduction of a sample image frame captured from an example user interface as part of the method of FIG. 2.

Depending on the interface response recorder (canvas or screen capturing unit) employed, the image frame as recorded may include only the visual content from the user interface, or it may also include surrounding content, such as a "desktop" of the operating system. To simplify the computations that will follow, it is preferable to crop each image frame to contain only a relevant portion of the image, as part of their preparation during block 239. FIG. 3A depicts an image frame displaying both an operating system desktop 310 and a user interface 320 with a menu 321 and canvas window 323. FIG. 3B depicts a cropped version of the same image frame, where all visual content other than the canvas window 323 has been removed through cropping. In another example, FIG. 3C reproduces a sample image frame captured from an example user interface (specifically, of an electronic design automation tool, where a user is placing a wire with a wire draw command) by an exemplary embodiment of the invention, and FIG. 3D reproduces a cropped version of the image frame of FIG. 3C. The relevant portion, and therefore, the cropped image frame, may be even more reduced to contain only a location where the visual prompt should appear, if this can be determined from the input event or events.

Returning to FIG. 2, it is noted that the preparation of the replay file at 217 and the complete test initialization stage 220 may be left out, and the input provided at 215 employed directly for the canvas capturing stage 230. The input events will still be recorded at 215, which will now occur simultaneously with the canvas capturing stage 230, and may be used in later tests without loss of reproducibility. However, by first recording the input events and later capturing the image frames from the emulation, a risk of increased lag due to simultaneous operation of these stages is reduced.

With all image frames recorded and prepared for analysis, a pixel difference computation stage 240 now begins. Specifically, at 241, the initial image frame recorded during the first iteration of canvas capture operation 231 is compared to another image frame recorded during a later iteration of canvas capture operation 231. The comparison process is preferably a comparison between pixel intensities of the respective image frames, these intensities separately computed. In one embodiment, the images are converted to grayscale (during, for example, the preparation at block 239), each pixel having a single grayscale value of 0 (pure black) to 255 (pure white), and the pixel intensity of each image frame is computed as a simple summation of the grayscale values of all pixels in the image. Other methods of representing pixel intensity, appropriate to the present and other embodiments, may also be conceived by those of skill in the art. Preferably, any change in pixel intensity between frames indicates a change in the visual content between frames; that is to say, an intensity difference threshold, beyond which a pixel intensity difference indicates the presence of a visual response to the input, is predefined to be zero. However, in some embodiments, the intensity difference threshold may be predefined to be greater than zero, to provide a margin of error, especially if the canvas might produce other, de minimis visual changes even without input. In more extreme cases, where the canvas can be expected to produce visual changes that are not in response to input but that are comparable to the input response in pixel intensity, an alternative detection stage is described further below.

Figure 3D:
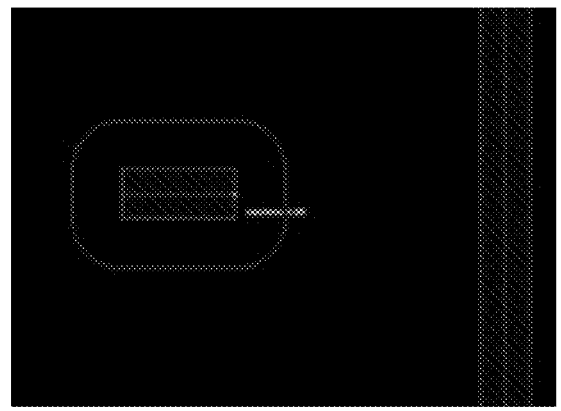
FIG. 3D is a reproduction of the image frame of FIG. 3C after undergoing a cropping operation of the method of FIG. 2.

Because the initial image frame was captured before the user interface had the opportunity to respond to the recorded input events, the initial image frame lacks a visual prompt responsive to said input events. Furthermore, no input besides the recorded input events is provided after the initial image frame. Therefore, any change in pixel intensity between the initial image frame and a later image frame indicates the appearance of the visual prompt, in response to the input events, in the later image frame. For instance, using the wire draw example provided above, the canvas of the user interface would be primarily black prior to the use of the wire draw command and therefore has a low pixel intensity value, according to the representation method described above. After the user interface has responded to the wire draw input event, a visual prompt in the form of a light-colored drawn wire appears as shown in FIG. 3D, increasing the pixel intensity value. (It is noted that FIG. 3D also contains another element to one side unrelated to the visual prompt. However, if this element was also present prior to the wire draw input event, although it will affect the initial pixel intensity, it will not affect whether the pixel intensity is determined to change in the later image frame.)

Therefore, at 243, it is determined whether a response was detected in the later image frame, in the form of a change in pixel intensity. To reduce error due to image artifacts, an intensity difference threshold may be predefined; if the difference between pixel intensities does not meet or exceed the threshold, the response determination 243 does not consider a response to have occurred. Alternatively, any detectable difference may suffice for the response determination 243.

If no response is detected, it is checked at 245 whether another image frame has not been compared to the initial image frame. If so, another image frame is selected at 247 and the flow returns to 241 for comparison of this additional frame to the initial frame. Preferably, the later image frames are considered in the order of capture; that is, the initial image frame is first compared to a second image frame recorded immediately after, then the initial image frame is compared to a third image frame recorded immediately after the second image frame, and so on.

If, at 243, a response (that is, the visual prompt) is detected in an image frame, said image frame is a responsive image frame. The pixel difference computation stage 240 therefore concludes and a visual responsiveness determination stage 250 begins. Specifically, at 251, it is reported that the user interface was responsive to the provided input events, because the visual prompt occurred before the predefined threshold elapsed. Preferably, it is also reported what time the visual prompt occurred; this may be determined from the time of capture associated with the responsive image frame. If the responsive image frame is instead associated with an order of capture, the time of capture may be extrapolated from the rate of frame capture. This time may represent a degree of responsiveness, or a degree or value may be determined therefrom.

Optionally, a more detailed report is generated at 255. This report may include the responsive image frame itself, which may be examined by other means, automated or otherwise, to confirm the presence of the expected visual prompt. The method then ends.

Due to the loop of blocks 231 and 233, image frames are captured only for the duration of the time threshold, beginning with the start time of the input events. Therefore, if, at 245, no image frames remain for comparison, this indicates that a visual prompt responsive to the input events did not occur before the time threshold elapsed. For instance, using the wire draw example provided above, if the canvas of the user interface remains primarily black in all image frames, and therefore maintains a constant pixel intensity value, despite the use of the wire draw command, the user interface failed to respond with a visual prompt within the threshold. The pixel difference computation stage 240 therefore concludes and a visual responsiveness determination stage 250 begins. Specifically, at 253, it is reported that the user interface was unresponsive to the provided input events, because the visual prompt did not occur before the predefined threshold elapsed. In such a case, the degree of responsiveness may be a simple "zero" value, or a "fail" or similar.

Optionally, a more detailed report is generated at 255. This report may include the last of the image frames, taken in order of capture, which may be examined by other means, automated or otherwise, to confirm the absence of the expected visual prompt. The method then ends.

Figure 2A:
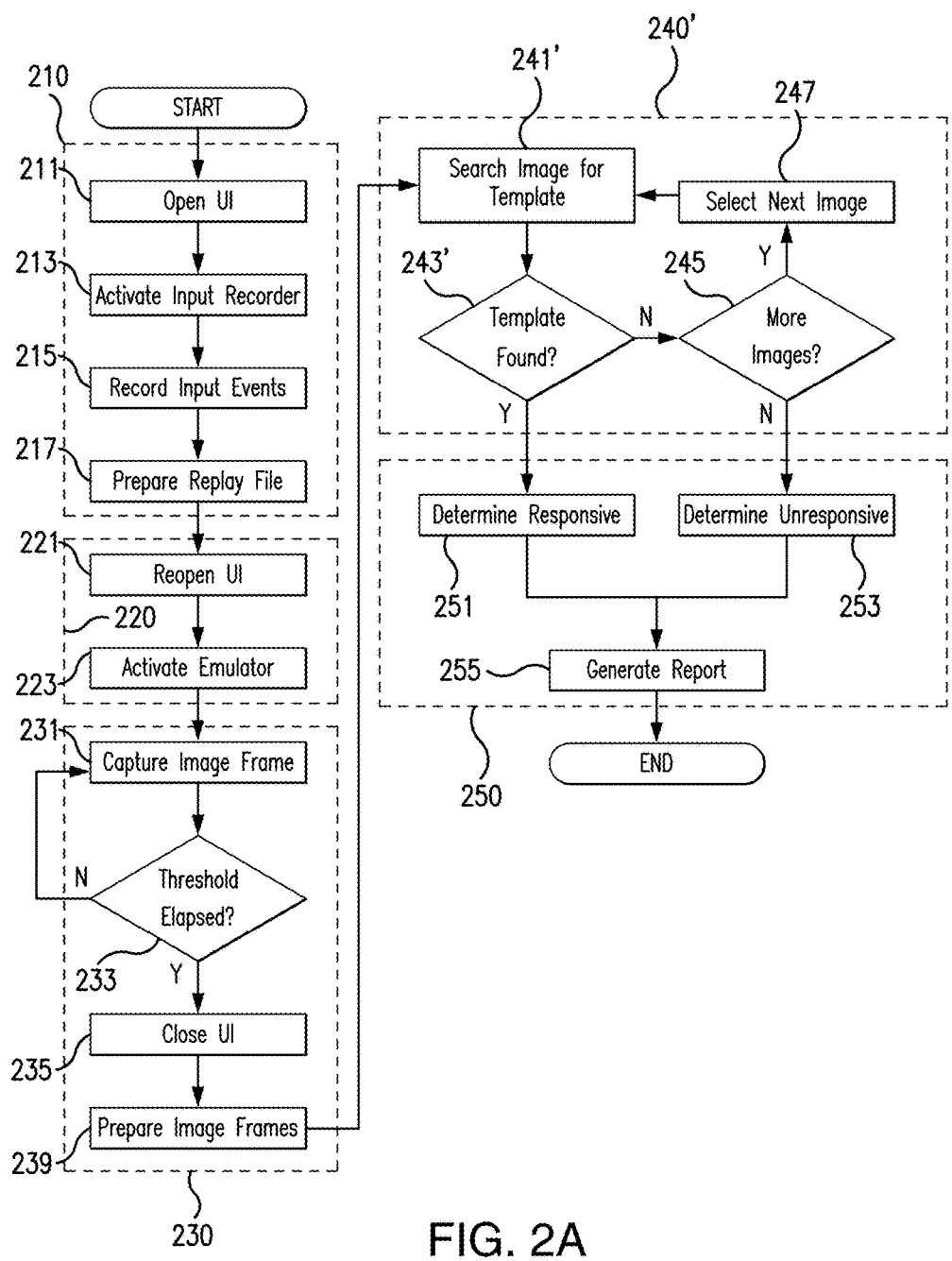
FIG. 2A is a block flowchart illustrating a variant of the method of FIG. 2, in accordance with another exemplary embodiment of the present invention.

FIG. 2A is a flow chart depicting a variation on the method of FIG. 2, according to another exemplary embodiment of the present invention. Most operations occur as in FIG. 2, although an initial image frame prior to, or at, the exact start time of the input event need not be recorded during a first iteration of 231; it is sufficient for the first recorded image frame to be within a small fraction of the time threshold after the input event. However, instead of a pixel difference computation stage 240, a template detection stage 240' follows the canvas capturing stage 230. Specifically, an image template of the expected visual prompt is predefined, and in 241' an image frame is searched to determine if said template is present. Several methods of searching images for a specified image template are well-known in the art and will not be elaborated upon. If, at 243', it is determined that the template is present in the image frame, said image frame is a responsive image frame and the flow proceeds to 251 as before; otherwise, it proceeds to 245 as before.

A template detection stage 240' may be more appropriate than the pixel difference computation stage 240 of FIG. 2 when the exact appearance of the expected visual prompt is known, such as a checkmark in a checkbox, or an open menu or subwindow, and it is also known that the template will not appear on the canvas unless and until the command is initialized. A template detection stage 240' may also be more appropriate when the nature of the user interface creates other visual changes even in lieu of input, which would make a change in pixel intensity meaningless for the purposes of the method. A template detection stage 240' may also be more appropriate when the nature of the expected visual prompt does not provide sufficient contrast against the user interface to be detected by a pixel intensity approach.

It is noted that either of these processes may be employed to check a command that can only be performed after previous commands, by including the inputs of the previous commands in the input recording or the replay file, and replaying them in the emulator, but delaying the canvas capturing stage 230 until after the previous commands are completed. For example, a test of a particular interface button may require first opening a subwindow containing the button. As another example, using the wire draw example provided above, it may be necessary to click on a user interface button activating the wire draw command (as distinguished from a command to draw some other component) before clicking on the canvas to draw the wire. The recorded inputs, or other inputs added to the replay file, will include those inputs that will open the subwindow, but the canvas capturing stage 230 will ignore those inputs and wait until the input that clicks the button, or until all inputs prior to said button input is complete, to capture the first image frame.

As disclosed above, the initial visual responsiveness of a user interface to an input may be automatically determined and quantified based on whether the canvas visually responds to the input event within a time threshold.

6. Embodiment to Detect Smoothness Lag

By noting the location of a continuous user input which should be tracked by a visual prompt in a user interface, detecting said tracking visual prompt in the user interface, and computing or otherwise determining the distance or delay between, the visual responsiveness of the user interface as related to smoothness may be quantified in an automated fashion. One method for doing so will now be detailed.

Figure 4:
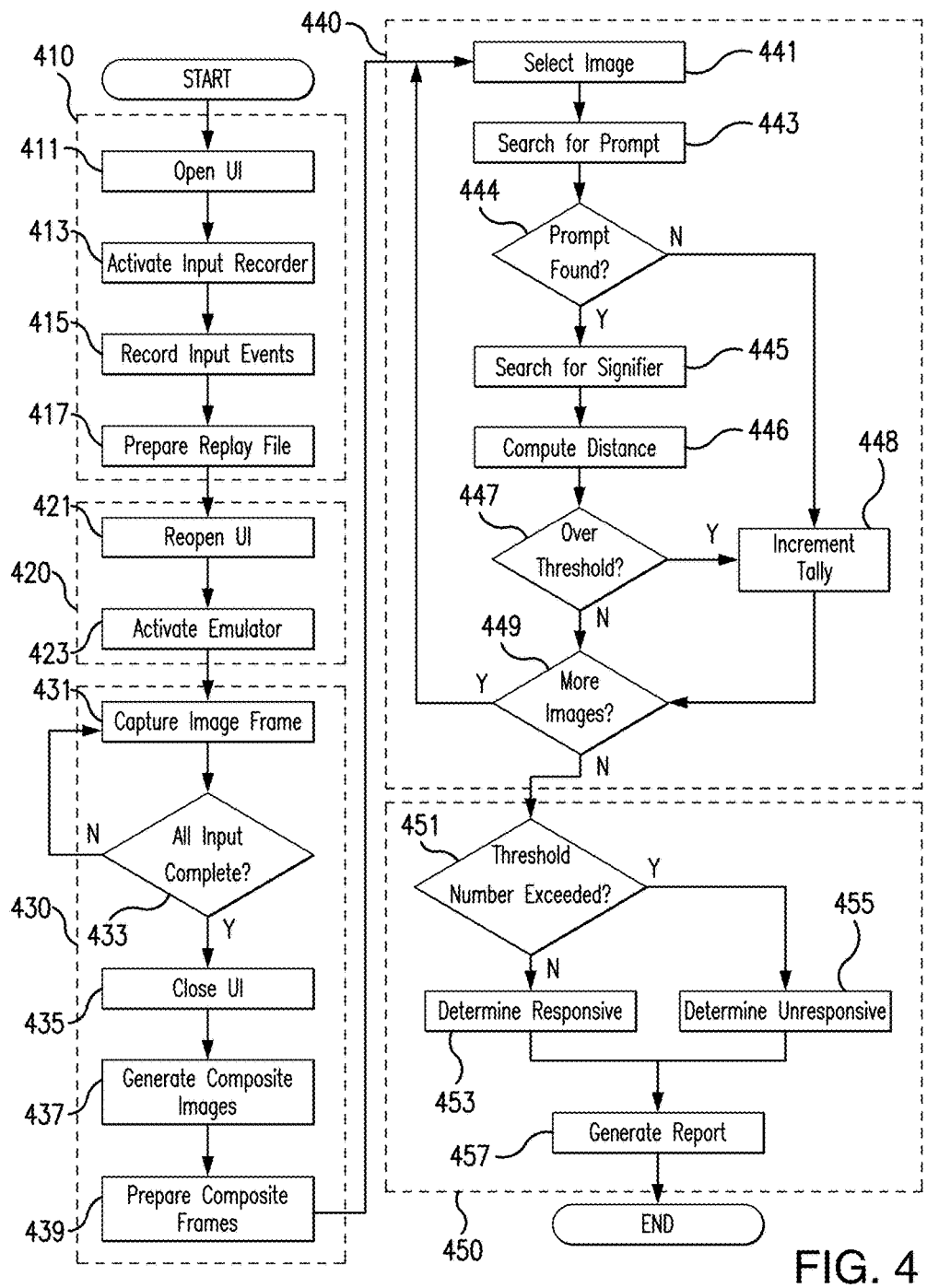
FIG. 4 is a block flowchart illustrating a method of determining a degree of visual responsiveness of user interface software in running a continuous command, in accordance with an exemplary embodiment of the present invention.

FIG. 4 is a flow chart depicting a method of determining a degree of visual responsiveness of user interface software in running a continuous command with a location parameter, according to an exemplary embodiment of the invention. Summarized, this method determines how often a visual prompt is located more than a distance threshold out of alignment with an input location.

The input recording stage 410 is essentially identical to the stage of the same name as depicted in FIG. 2. That is, the user interface is opened at 411, the input event recorder is activated at 413, the input events are provided for capture and recording at 415, and the replay file is prepared, if necessary, at 417. Because the test is for a command in motion, the inputs provided and recorded at 415 are generally more elaborate than those for FIG. 2, and preferably include not only an initialization of the command but multiple rapid movements or other inputs. As one example, if the command being tested is a wire draw command in an electronic design automation tool, the input might be to click with a wire draw tool, then to move the mouse back and forth three or four times while holding the mouse button down, continually changing the intended length and/or direction of the wire.

The input recording stage 410 need only be conducted once as described, and the resulting replay file or recording may be used for an unlimited number of tests involving remaining stages 420, 430, 440, and 450, which are described below.

The test initialization stage 420 is also essentially identical to the stage of the same name as depicted in FIG. 2. That is, the user interface is activated at 421, and the input emulator is configured to replay the recorded input events at 423. Unlike in the initialization lag test, the presence or absence of the command in memory is not critical to a smoothness lag test; however, it is still preferable to activate the user interface immediately before testing the command in question, to ensure that other elements of the user interface are in a consistent state with each test. To the extent that this fresh activation generates a separate initialization lag, it can be accounted for by separately determining said initialization lag first, using the methods previously described or other appropriate methods.

With the emulator replaying the recorded events, a canvas capturing stage 430 immediately begins, as an interface response recorder (canvas or screen capturing unit) records an image frame from the canvas at 431. Preferably, a time of capture or an order of capture is associated with the image frame.

The initial image frame may be captured at the moment of, or right after, the first of the recorded events is replayed. However, if the initialization lag for the same input has been measured in a previous test, the capture of the first image frame may be delayed until the initialization lag time has elapsed, to eliminate the effects of initialization lag from the smoothness lag test. Other methods of accounting for this lag are also possible, some of which will be described further herein.

At 433 it is determined whether all input events have been completed. If not, the flow returns to 431 to capture an additional image frame. If all events have completed, however, the loop ends. Preferably, the user interface is closed at this time, at 435.

At 437, a composite image frame is generated from each recorded image frame, as described below.

Each input event is recorded with a coordinate location, relative either to the user interface or to the display itself. For instance, a mouse input naturally has a location somewhere on a screen according to the movements of the mouse, while a keyboard input may have a location based on where the inputted character will be placed in a text box or word processor. A root sample signifier—a signifier of the location of an input event at the time the event was sampled—may be displayed at said location within a recorded image frame corresponding in time to the time of the sample, overlaid upon the displayed user interface in the recorded image frame. The resulting combination, displaying both a recorded image frame and the input signifier corresponding in time to the frame, is a composite image frame.

The composite image frames may then be prepared for analysis at 439, in much the same manner as in block 239 in FIG. 2. That is, the frames may be cropped, converted to greyscale, and/or put through other processing that will simplify the analysis process to follow.

Figure 5A:
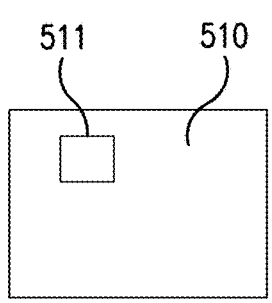
FIG. 5A depicts an example image frame captured as part of the method of FIG. 4.
Figure 5B:
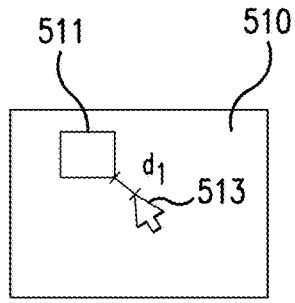
FIG. 5B depicts an example composite image frame, generated from the captured image frame of FIG. 5A as part of the method of FIG. 4.

FIG. 5A depicts a prepared version of an image frame. A user interface 510 with a visual prompt 511 may be seen within the image frame. FIG. 5B depicts the composite version of the image frame, again prepared through cropping, where the input event location is signified by a replica of an operating system cursor 513. All elements from the image frame of FIG. 5A are also still displayed, unless covered by the operating system cursor 513. In another example, FIG. 5D reproduces a sample image frame captured and recorded from an example user interface (specifically, of an electronic design automation tool, where a user is placing a wire with a wire draw command), and thereafter prepared for analysis, and FIG. 5E reproduces a sample prepared composite image frame generated therefrom.

It is noted that any visual template may signify the input event location. It is preferable that the template is easily identifiable by image analysis, by providing sufficient contrast when overlaid upon the user interface, but it need not correspond to the appearance of the provided input. That is, the location of a mouse input need not be signified by an operating system cursor, but instead by a cross, a circle, or a star, among many other possibilities. Indeed, in some cases, the original operating system cursor might not produce sufficient contrast against the user interface, and a template with a higher contrast would therefore be preferable. Additionally, the input event might not have involved a cursor, for instance if the input device was a touch screen of a tablet or smartphone. However, for convenience, the root level signifier will hereinafter have the appearance of a cursor as described and depicted.

Once the composite image frames are prepared for analysis at 439, the canvas capturing stage 430 concludes and a distance computation stage 440 begins. Specifically, at 441, a composite image is selected. Selection is preferably in order of capture of the original recorded image frames. At 443, the composite image is searched for the visual prompt. The visual prompt, or visual response, may be located by searching for a predefined image template, as with block 241' in FIG. 2A. The signifier for the input sample location is similarly located by a search at 445.

A benchmark or threshold distance establishes a distance within which the interface should maintain its visual prompt relative to the input, preferably reflective of whether the distance would be noticed and commented on by a user. Additionally, a threshold number or percentage of failures to meet the threshold distance is also predefined. Both thresholds are predefined for the test no later than the completion of the emulator configuration at 423, and are preferably selected prior to the start of the method at 411. Each set of input events to be tested may have its own threshold distance, or a general threshold distance may be set. If the visual prompt falls outside the threshold distance more than the threshold number of times, the interface is unresponsive; that is, below a benchmark responsiveness. If the visual prompt falls outside the threshold distance, but not more than the threshold number of times, the delay may be considered a fluke, or too brief to be noticed by a user.

Empirical research and polling of human users has suggested that, in some contexts, 30-35 pixels of difference, at least 20% of the time, is intolerable for a user, and therefore the threshold distance for any set of input events is preferably set to 35 pixels or lower, while the threshold number is preferably set to a number equivalent to 20% of the frames recorded. However, in other contexts, due to differences in the behavior and appearance of specific software, operating systems, displays, or input methods, the preferred threshold distance or threshold number may be quite different. For example, a touch screen frequently requires greater correspondence between the input and the response to avoid the perception of unresponsiveness and therefore should have one or more of the thresholds set to a lower value, while a UI where input is expected to be slow and considered might be manageable with more generous thresholds.

Figure 5C:
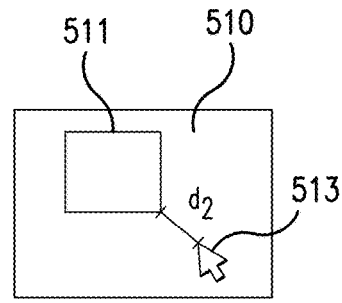
FIG. 5C depicts another example composite image frame generated as part of the method of FIG. 4.
Figure 5D:
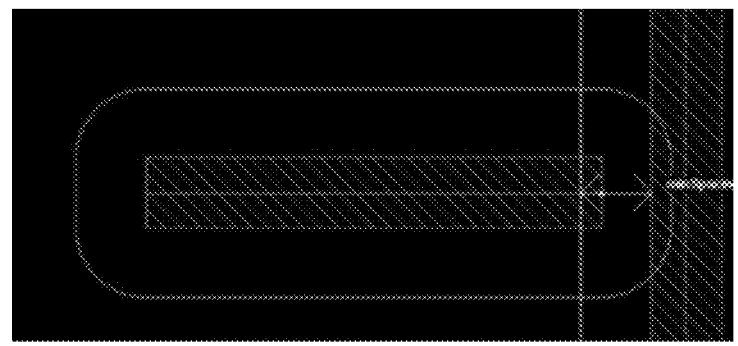
FIG. 5D is a reproduction of a sample image frame captured from an example user interface as part of the method of FIG. 4.
Figure 5E:
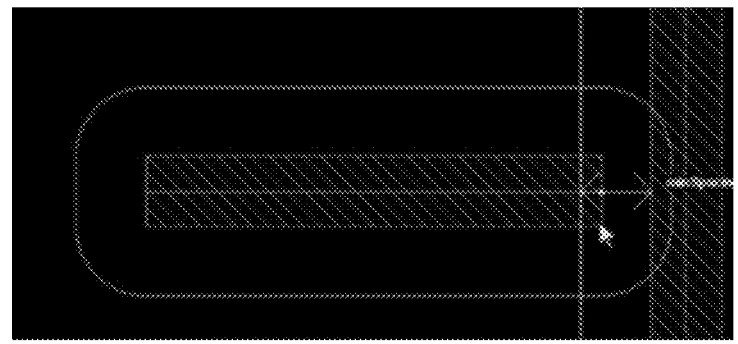
FIG. 5E is a reproduction of a sample composite image frame, generated from the captured image frame of FIG. 5D as part of the method of FIG. 4.

Returning to FIG. 5B, the composite image frame depicts that the cursor 513, which is an input signifier, is a short distance d1 from the visual response 511. FIG. 5C depicts a different composite image frame, after the location of the input event, and therefore the signifying cursor 513, has been moved. However, the location of the visual response 511 has not followed as swiftly, and is now a longer distance d2 from the signifying cursor 513. Similarly, FIG. 5F reproduces another sample composite image frame captured and generated from the example EDA tool user interface previously referenced by FIGS. 5D and 5E. Here, too, a cursor is visibly distant from a visual response, said visual response being the end of the drawn wire in this example, in contrast with FIG. 5E where they are substantially in alignment.

Figure 5F:
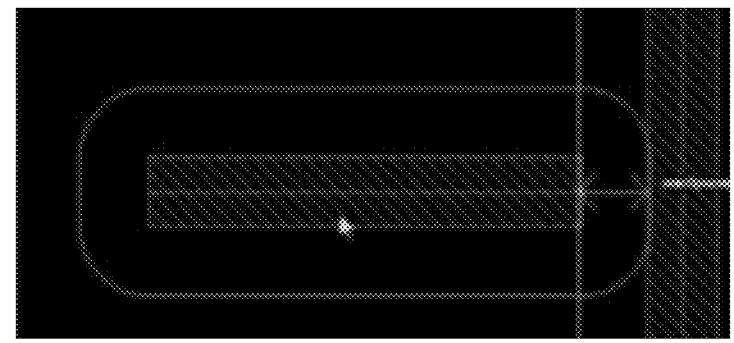
FIG. 5F is a reproduction of another sample composite image frame captured and generated from an example user interface as part of the method of FIG. 4.

In at least some contexts, if the threshold distance is exceeded, as depicted in FIGS. 5C and 5F, for one frame in ten (which at a frame capture rate of five frames a second would be every two seconds) or less, then the interface might be termed responsive, but if it occurs one frame in two (more than twice a second), then a user is very likely to perceive the response being "jittery" or falling behind, and the interface is best termed unresponsive. In these contexts, the threshold ratio or other number may be set to no greater than 20% of the captured frames, or alternatively no greater than one frame a second. However, as previously noted, the threshold ratio or other number may be quite different in other contexts, according to the needs of the user interface, input device, and other factors, and is therefore not so limited.

Therefore, returning to FIG. 4, a distance between the signifier and the response is computed, or otherwise determined, at 446. The distance may be in pixels or some other measurement. Methods of computing or otherwise determining a distance between two points in an image are well-known in the art and will not be elaborated upon.

It is then determined, at 447, whether the computed distance for the composite image frame is within the predefined threshold distance or not. If not, the flow proceeds to 448 to increment an "unresponsive" tally, indicating the total number of frames in which the canvas was insufficiently responsive to the input. The image itself may also, in some embodiments, be associated with an "unresponsive frame" label at 448, either directly by an addition to the data of the image or frame, in a list or database of responsive and unresponsive frames, or both. The flow then proceeds to 449.

If, however, the distance is within the threshold at 447, the flow proceeds directly to 449. Although not depicted, the present image may also be associated with a "responsive frame" label.

At 449, it is checked whether another image frame has not been searched, and if such a frame exists, the flow returns to 441, selecting a new composite image and repeating the loop for the distance computation stage 440. Otherwise, the flow proceeds to the next stage.

If the initialization lag is not accounted for in determining when to start the image capture, the first few frames will have no visual prompt at all. In such embodiments, a check at 444 determines if the prompt is present in the image frame at all. If so, the flow proceeds to 445 as described earlier. However, if the prompt is not present, the image frame may not be from a point in the emulation where the interface has begun its response; that is, the initialization lag is still in effect. These frames may in some embodiments be ignored as not helpful for this particular test, and the flow immediately proceeds to 449. However, in the embodiment depicted in FIG. 4, the "unresponsive frame" tally is first incremented at 448. It is noted that, in some user interfaces, it may be possible for the visual prompt to not only lag behind the input location but disappear entirely, even after the initialization lag has resolved, and therefore, it may be preferable to include this flow path such that these disappearing prompts are not inadvertently ignored as initialization lag.

In a visual responsiveness determination stage 450, at 451 it is determined whether the number of "unresponsive" frames exceeded the predefined threshold number—that is, if, in more than the predefined threshold number of composite image frames, the distance between the input sample signifier and the visual response exceeded the predefined distance threshold. In embodiments where the initialization lag is not accounted for in some other manner, the predefined threshold number may be adjusted to account for the number of frames which can be expected to fail at block 444 due to said initialization lag, as determined through prior testing.

If the predefined threshold number is not exceeded, at 453 it is reported that the user interface was sufficiently responsive to the provided input events, because the visual prompt was not separated from the input event by at least the threshold distance often enough to be noticeable by a user. In such a case, the degree of responsiveness may be a simple "one" value, or a "pass" or similar. Alternatively, the degree may be the number or ratio of frames for which the distance between the visual prompt and the input exceeded the threshold distance, or determined therefrom.

If the predefined threshold number is exceeded, at 455 it is reported that the user interface was excessively unresponsive to the provided input events, because the visual prompt was separated from the input event by at least the threshold distance often enough to be noticeable by a user. In such a case, the degree of responsiveness may be a simple "zero" value, or a "fail" or similar. Alternatively, the degree may be the number or ratio of frames for which the distance between the visual prompt and the input exceeded the threshold distance, or determined therefrom.

In either case, optionally, a more detailed report is generated at 457. This report may include the distance values for all frames. This report may also include any composite image frames where the distance exceeded the threshold (that is, "unresponsive frames" or "problem frames"), which may be examined by other means, automated or otherwise, to confirm the distance is excessive in the frames in question. The method then ends.

In an undepicted variation on stages 440 and 450, block 448 may increment two tallies: a current subseries tally and a longest subseries tally. The longest subseries tally increments only if the incrementing current subseries tally would otherwise exceed the longest subseries tally. If the distance determined at 446 is found to be within the distance threshold at 447, the current subseries tally resets to zero. In this manner, or using other methods which will be recognized by those skilled in the art, the longest subseries tally measures the longest consecutive subseries of unresponsive frames. Using this approach, block 451 can then compare the longest subseries tally to the predefined threshold number, and check whether a consecutive subseries of composite image frames exists, the subseries longer than the predefined threshold number, such that each image frame in the subseries exceeds the predefined distance threshold. That is, this variation of block 451 determines whether the threshold distance remains exceeded for a period, said period reflected by the consecutive threshold number of frames, rather than exceeded briefly and repeatedly only to be recovered in a prompt manner each time.

When the difference between the desired prompt and the actual prompt is best defined in terms of location, the use of composite images is preferable, as it determines where the input location is relative to the user interface rather than to the larger operating system display. This accounts for variations such as screen resolution or the exact screen position in which the user interface opens, which might vary radically between displays.

Nonetheless, input location is not always relevant in an analysis of a particular case of smoothness lag. For instance, when checking a checkbox repeatedly, it is more relevant whether the checkmark appears or disappears, and whether the intended effects of the checkbox result on the screen. In another case, when typing text into a text field, the most relevant difference is between the latest keystroke and the latest character to appear. In both cases, composite images are not helpful to the analysis.

Figure 4A:
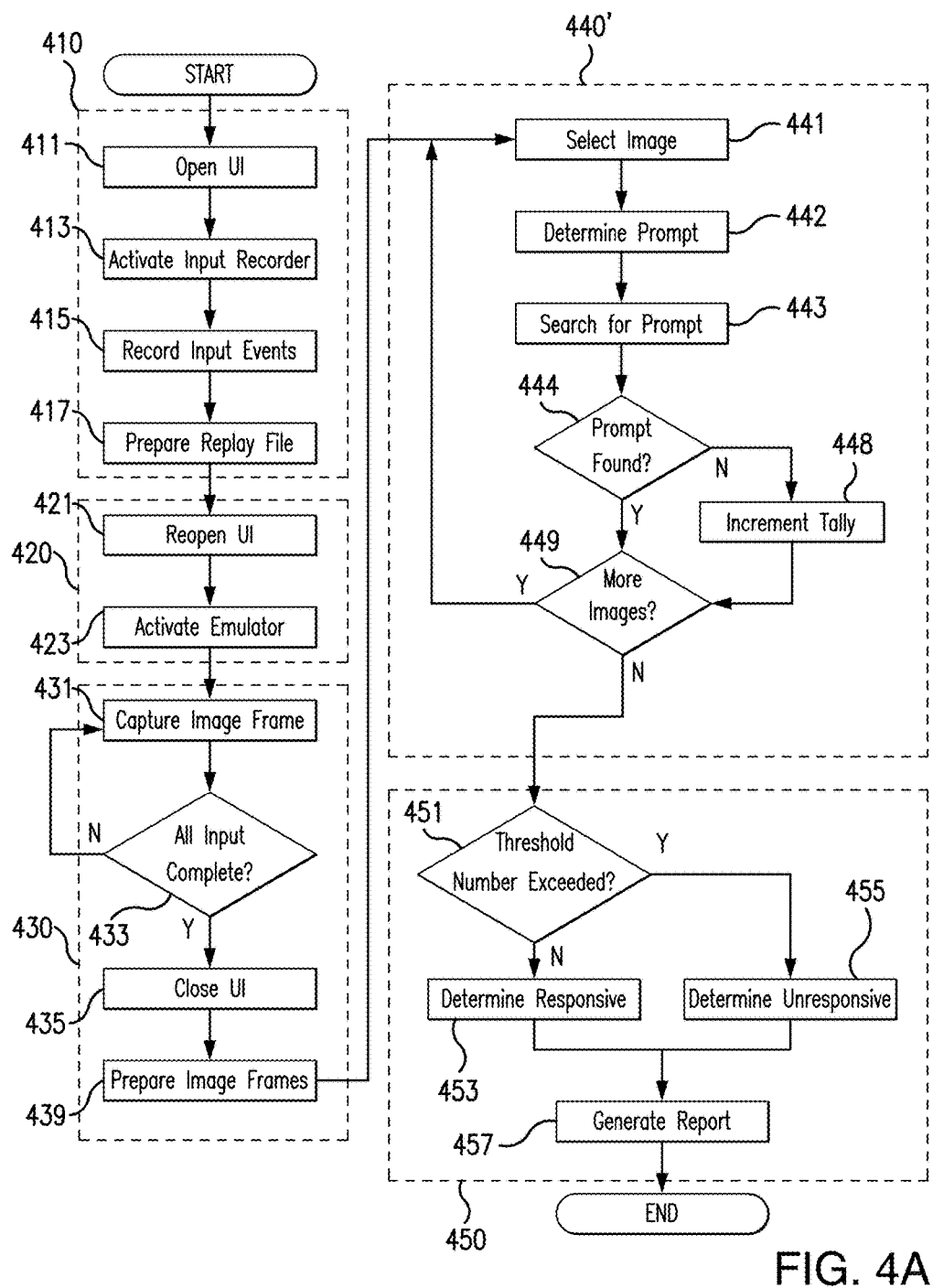
FIG. 4A is a block flowchart illustrating a variant of the method of FIG. 4, in accordance with another exemplary embodiment of the present invention.

FIG. 4A is a flow chart depicting a variation on the method of FIG. 4, according to another exemplary embodiment of the present invention, when running a continuous command without a location parameter. Most operations occur as in FIG. 4. However, the composite image frame generation 437 is omitted and the original captured images are prepared at 439 instead. Additionally, the distance computation stage 440 is replaced with a visual prompt comparison stage 440', which is described below.

At 441, an image frame is selected as in the distance computation stage 440, although from the original captured images (post-preparation) rather than composite images.

A visual prompt reflects visual content that appears on the canvas in response to the input event. In the distance computation stage 440 of FIG. 4, the form of the visual prompt could be assumed to be constant for the duration of a location-based input, as the edge or corner of a rendered object in motion. However, for other types of input, the prompt may change form with each input event. Therefore, at 442, the appropriate visual prompt is determined from the input event corresponding in time to the selected image frame. The appropriate visual prompt is an expected visual response to the input event in the canvas, preferably accounting for any previous input events and their visual responses.

One determination method involves capturing image frames during the input event recording 415, one after each input event is received and fully processed, and associating each frame with the corresponding input event. If these image frames are prepared in the same manner as those frames captured at 431 and prepared at 439, they may serve as visual prompts to indicate the canvas has responded to the event. At 442, the visual prompt image associated with the particular event is selected.

However, an image capture of the entire relevant region of the canvas may be excessive for reasons of space, and may also inadvertently include irrelevant content that may not be present in later tests. Simplified visual prompts might be determined in various ways, dependent in part on the input but including:

If the input was a click on a checkbox, the visual prompt may be the box in a checked state, or it may be some unique response to the checkbox elsewhere on the canvas, such as a rearrangement of other visual content.

If the input was a click on a button that opens a subwindow, the visual prompt may be the subwindow, or any uniquely-identifying portion thereof If the input was textual input in a text box, the visual prompt may be the entire text input provided from the selection of the text box to the latest keystroke, formatted appropriately, or any uniquely-identifying portion thereof.

Other visual prompts, corresponding to other input events in the context of a given user interface, may be imagined by those of skill in the art, and may be set at some point during the input recording stage 410 and selected at 442, or automatically determined and generated at 442.

Once the prompt is determined, it is searched for in the selected image at 443, as in FIG. 4. If, at 444, it is determined that the prompt was in the selected image, then the image frame was responsive to the latest input and the flow proceeds directly to 449. If the visual prompt is not located in the image, then the image frame was not responsive to the latest input and the "unresponsive frame" tally is incremented at 448, before proceeding to 449. The labels, lists, and/or databases of responsive and unresponsive frames may also be implemented as described above for the distance computation stage 440.

Block 449 operates much as in FIG. 4, but for original images instead of composite images, either repeating the stage for the next image or proceeding to the visual responsiveness determination stage 450 if no more unsearched images exist.

As disclosed above, the visual responsiveness of a user interface to a continuous input may be automatically determined and quantified, either from a distance between the current input location and the current response location, or from other differences between the expected visual response to an input event and the actual visual content of the canvas at the time of the input event.

7. System Implementations

Figure 6:
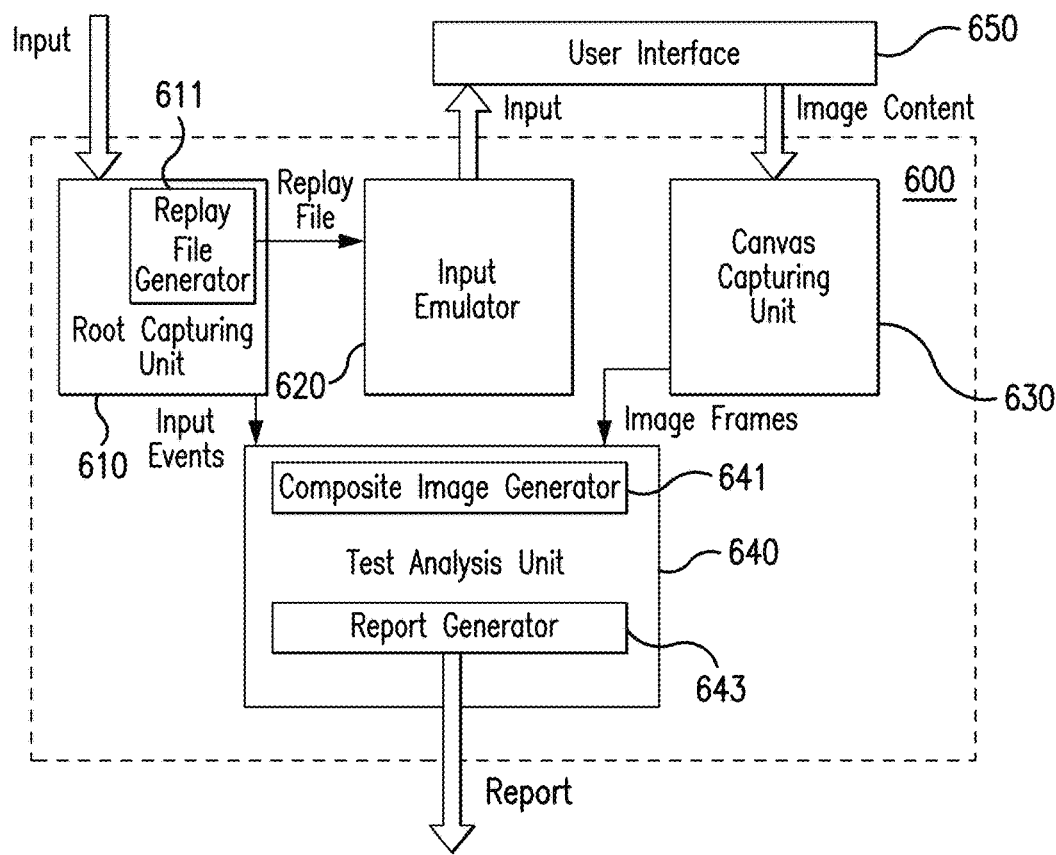
FIG. 6 is a block diagram illustrating a system determining a degree of visual responsiveness of user interface software in initializing a command, in accordance with an exemplary embodiment of the present invention.

FIG. 6 depicts a system 600 implementing the above processes, according to an exemplary embodiment of the present invention.

A root capturing unit 610, or input event recorder, receives input from a user input device, and is configured to execute at least the recording of these inputs 215/415 of FIGS. 2 and 4, or similar. The root capturing unit 610 may also execute the replay file generation 217/417, which may be more specifically executed by a replay file generator subcomponent 611.

The root capturing unit 610 provides the replay file, or the raw input event samples, to an input emulator 620, which emulates the previous input within a user interface 650 which is being tested. The input emulator is configured to execute at least the test initialization stage 220/420 of FIGS. 2 and 4, or similar, and to continue the emulation during the canvas capturing stage 430.

The emulator 620 also activates a canvas capturing unit 630, or interface response recorder, which is configured to execute at least the image frame recording 231/431 FIGS. 2 and 4, or similar, from the user interface 650 during the emulation. The remaining operations of the canvas capturing stage 430 may be executed by either the input emulator 620 or the canvas capturing unit 630.

The canvas capturing unit 630 provides the recorded image frames to a test analysis unit 640, and the root capturing unit 610 provides the recorded input event samples to the test analysis unit 640. Using this information, the test analysis unit 640 is configured to execute a parametric difference computation or determination. Depending on the specific configuration, this computation or determination may be a pixel difference computation stage 240 as depicted in FIG. 2, a template detection stage 240' as depicted in FIG. 2A, a distance computation stage 440 as depicted in FIG. 4, a visual prompt comparison stage 440' as depicted in FIG. 4A, or another parametric difference computation or determination. The test analysis unit 640 may also be able to switch between these parametric difference computations according to a user selection.

The test analysis unit 640 is also configured to execute the visual responsiveness determination stage 250/450 of FIGS. 2 and 4, or similar. This may include the report generation 255/457, which may be more specifically executed by a report generator subcomponent 643. The test analysis unit 640 outputs the determined degree of responsiveness, as part of a report or separately.

In embodiments where the test analysis unit 640 is configured to execute the method depicted in FIG. 4, a composite image generator 641 may also be provided. As depicted, the composite image generator 641 is a subcomponent of the test analysis unit 640, but it may also be a subcomponent of the canvas capturing unit 630, or an independent component. The composite image generator 641 is configured to execute at least the composite image generation 437 of FIG. 4, or similar.

In some embodiments, the recording of the input may optionally be simultaneous with the recording of the display content. In such executions, the emulator 620 is not used and may not be present, and the display content is received for recording by the canvas capturing unit 630 directly from the same source as the input.

Figure 6A:
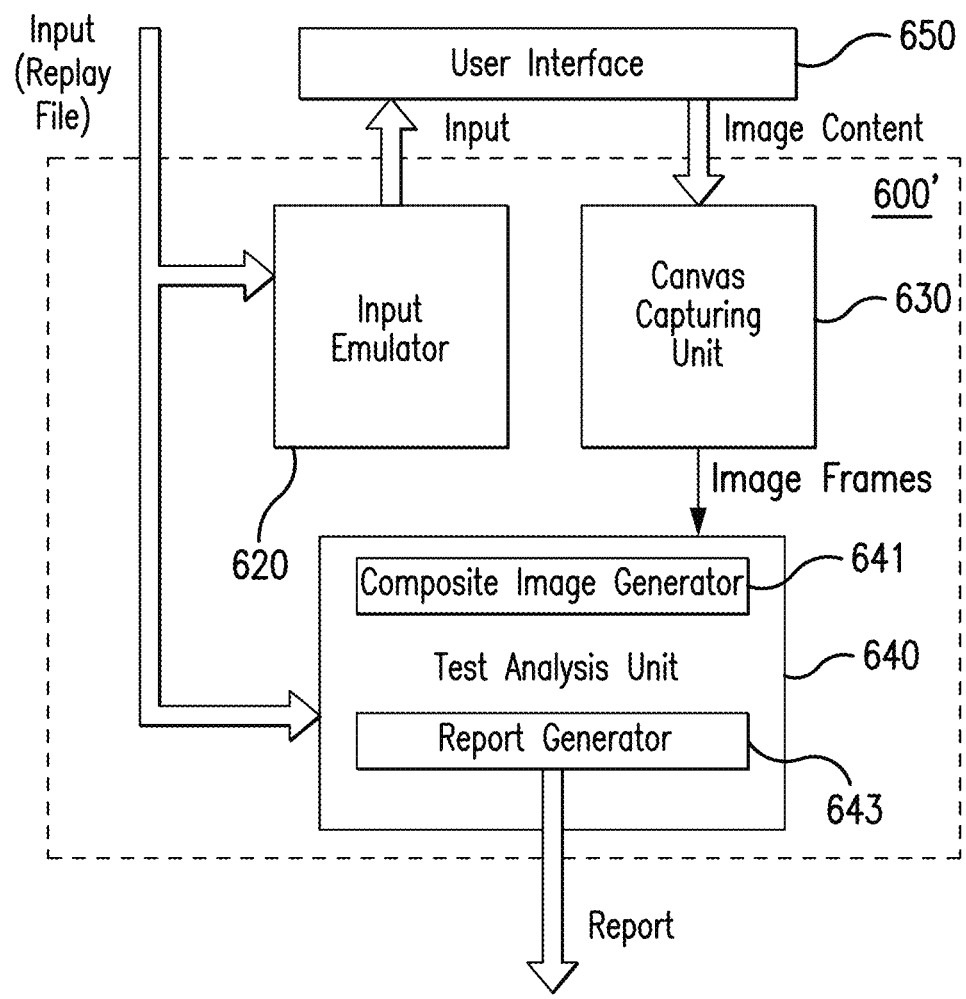
FIG. 6A is a block diagram illustrating a variant of the system of FIG. 6, in accordance with another exemplary embodiment of the present invention.

FIG. 6A depicts a supporting system 600' which is a variant on the system 600 of FIG. 6, according to another exemplary embodiment of the present invention. Supporting system 600' shares many components with the system 600 of FIG. 6, but is implemented without the root capturing unit 610. This supporting system 600' instead receives, from an outside source, previously recorded input event samples and/or replay files. This data may have been captured and recorded by a system similar to the system 600 of FIG. 6, or by a system having only a root capturing unit 610. In this manner, input may be captured and recorded at one location and then distributed to multiple locations, allowing for reproduction of the intended test on numerous computers.

As an additional advantage, this supporting system 600', along with the input recordings or input replay file, may be provided to end users. If an end user perceives time lag in a copy of the user interface installed on a particular end user machine, one or more of the methods described above, minus the input recording stage, may be executed using instantiations of the supporting system 600' and some or all of the user interface 650 on the end user machine, using the same set of inputs. The methods may also be executed on a control machine for comparison. Because the same input recording or input replay file is identical for both machines, variability between user inputs is reduced or eliminated, and because the time lag is determined in an automated and identical fashion, variability between user perceptions is reduced or eliminated. Therefore, if the perceived time lag is present on both machines according to the testing process, the time lag is confirmed as real and generally present in the user interface. If the perceived time lag is present on the end user machine but not the control machine, the time lag is confirmed as real specifically in the combination of the end user machine and the user interface, and may be the result of user hardware issues. If the perceived time lag is not present on either machine, the time lag cannot be quantifiably reproduced and need not be addressed.

In certain implementations, the system may suitably employ a dedicated processor or processing portions of a system on chip (SOC), portions of a field programmable gate array (FPGA), or other such suitable measures, executing processor instructions for performing the functions described herein or emulating certain structures defined herein. Suitable circuits using, for example, discrete logic gates such as in an Application Specific Integrated Circuit (ASIC), Programmable Logic Array (PLA), or Field Programmable Gate Arrays (FPGA) may also be developed to perform these functions.

Figure 7:
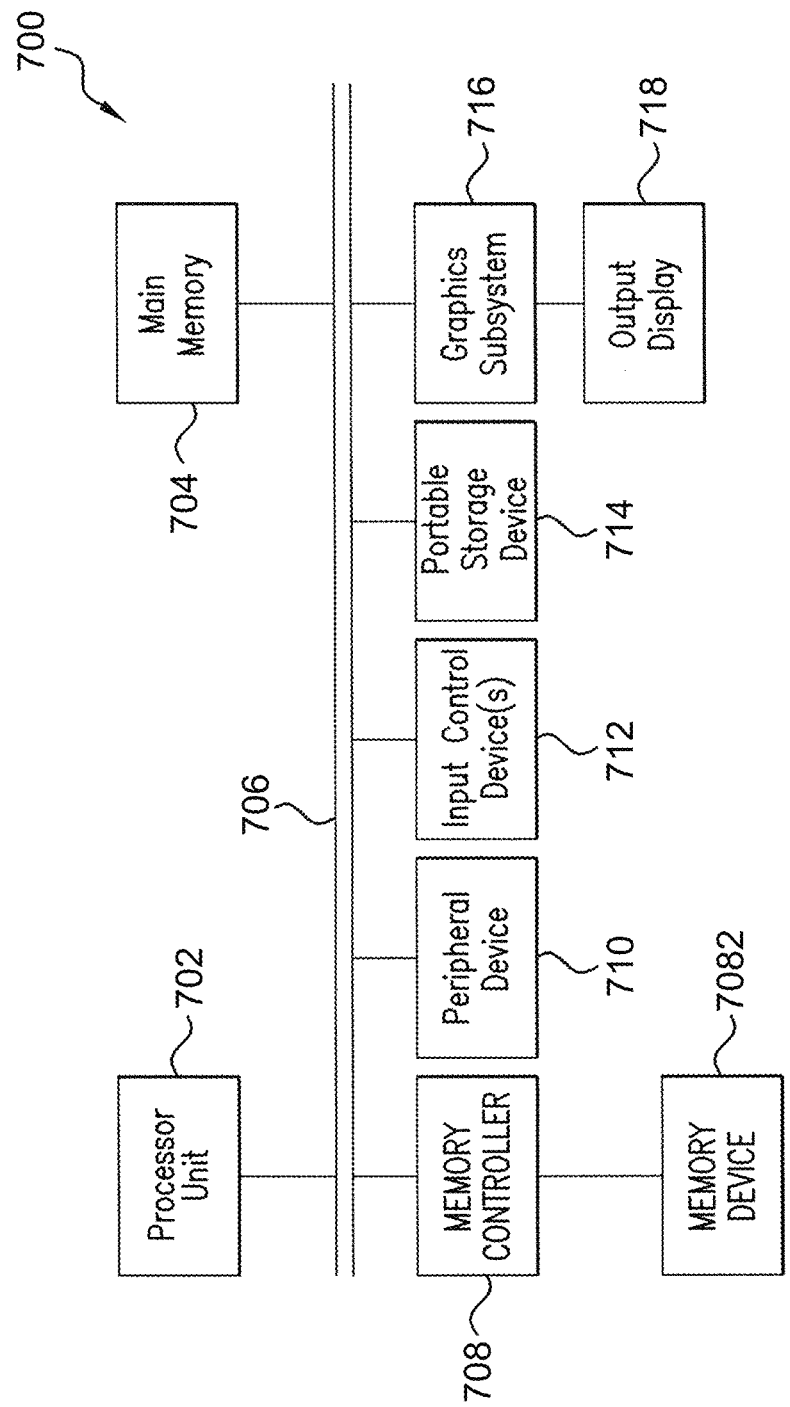
FIG. 7 is a block diagram illustrating an exemplary computer system for programmatic and/or hardware implementation of various embodiments and aspects of the present invention.

As an example, FIG. 7 is a block diagram illustrating an exemplary computer system for programmatic and/or hardware implementation of various aspects of the disclosed system and method. For instance, it may serve as a host for such hardware modules, and/or as a host for executing software modules such as EDA tools/simulations/emulation/firmware, in accordance with various configurations of the disclosed system and method.

A computer system 700 contains: a processor unit 702, a main memory 704, an interconnect bus 706, a memory controller 708 that is coupled to a memory device 7082, peripheral device(s) 710, input control device(s) 712, portable storage medium drive(s) 714, a graphics subsystem 716, and an output display 718. Processor unit 702 may include a single microprocessor or a plurality of microprocessors for configuring computer system 700 as a multiprocessor system. Main memory 704 stores, in part, instructions and data to be executed by processor unit 702. Main memory 704 preferably includes banks of dynamic random access memory (DRAM) as well as high-speed cache memory.

For the purpose of simplicity, the components of computer system 700 are interconnected via interconnect bus 706. However, computer system 700 may be interconnected through one or more data transport means. For example, processor unit 702 and main memory 704 may be interconnected via a local microprocessor bus; and memory controller 708, peripheral device(s) 710, portable storage medium drive(s) 714, and graphics subsystem 716 may be interconnected via one or more input/output (I/O) buses. Memory device 7082 may be implemented as a nonvolatile semiconductor memory for storing data and instructions to be used by processor unit 702. Memory device 7082 may store the software to load it to the main memory 704 or may be represented in an EDA tool simulation by suitable classes (incorporating data structures and functions operable upon the data structures) or the like as would be known to one of skill in the art.

Portable storage medium drive 714 operates to input and output data and code to and from the computer system 700. In one configuration, the software is stored on such a portable medium, and is input to computer system 700 via portable storage medium drive 714. Peripheral device(s) 710 may include any type of computer support device such as an input/output (I/O) interface, to add additional functionality to computer system 700. For example, peripheral device(s) 710 may include a network interface card, to interface computer system 700 to a network. Peripheral device(s) may also include a memory controller and nonvolatile memory.

Input control device(s) 712 provide a portion of the user interface for a computer system 700 user. Input control device(s) 712 may include an alphanumeric keypad for inputting alphanumeric and other key information; and a cursor control device such as a mouse, a trackpad or stylus; or cursor direction keys.

In order to display textual and graphical information, computer system 700 contains graphics subsystem 714 and output display(s) 718. Output display 718 may include a cathode ray tube (CRT) display, liquid crystal display (LCD), plasma, or active matrix organic light emitting diode (AMOLED) display. Graphics subsystem 716 receives textual and graphical information, and processes the information for output to display 718.

The descriptions above are intended to illustrate possible implementations of the disclosed system and method, and are not restrictive. While this disclosure has been made in connection with specific forms and embodiments thereof, it will be appreciated that various modifications other than those discussed above may be resorted to without departing from the spirit or scope of the disclosed system and method. Such variations, modifications, and alternatives will become apparent to the skilled artisan upon a review of the disclosure. For example, functionally equivalent elements or method steps may be substituted for those specifically shown and described, and certain features may be used independently of other features, and all or some of the above embodiments may be selectively combined with each other, and in certain cases, particular locations of elements or sequence of method steps may be reversed or interposed, all without departing from the spirit or scope of the disclosed system and method as defined in the appended claims. The scope should therefore be determined with reference to the description above and the appended claims, along with their full range of equivalents.

What is claimed is:

1. A system for testing user interface software for time lag in actuating a visual prompt responsive to user manipulation of a user input device, the system comprising:
   a display unit defining a canvas for displaying image frames;
   a root capturing unit executable to capture user actuation of the user input device as at least one root event at a root software level, an operating system operating at the root software level, each root event being captured as a series of time-displaced samples of input device actuation;
   a canvas capturing unit executable to capture processing of the root event by the user interface software as a canvas response at a canvas software level, the user interface software operating at the canvas software level for user interaction with an application, the canvas response being captured as a series of time-displaced image frames; and,
   a test analysis unit coupled to said root and canvas capturing units, said test analysis unit executable to determine a parametric difference between corresponding ones of the root events and canvas responses, and to determine a degree of visual responsiveness for the user interface software based thereon, said test analysis unit thereby discriminating portions of the time lag introduced at the canvas software level from portions of the time lag introduced at the root software level.

2. The system of claim 1, wherein the parametric difference corresponds to a response time difference between a start time of the input device actuation and a visual start time of the canvas response.

3. The system of claim 2, wherein:
   each of the canvas image frames includes a time parameter,
   the test analysis unit is further executable to determine a pixel intensity of an image frame, and
   the test analysis unit determines the visual start time of the canvas response to be the time of a changed canvas image frame having a difference in pixel intensity from that of an initial canvas image frame exceeding a predefined intensity difference threshold, the initial canvas image frame having a time corresponding in time to the start time of the input device actuation.

4. The system of claim 2, wherein:
   each of the canvas image frames includes a time parameter,
   the test analysis unit is further executable to detect a predefined response image template within an image frame, and
   the test analysis unit determines the visual start time of the canvas response to be the time of a responding canvas image frame containing the predefined response image template.

5. The system of claim 2, wherein:
   each of the canvas image frames includes a time parameter,
   the canvas capturing unit captures the processing of the root event for the duration of a predefined time threshold; and
   the degree of visual responsiveness is determined to be below a benchmark responsiveness if the visual start time of the canvas response is determined not to be a time of any image frame of the series of time-displaced image frames.

6. The system of claim 1, wherein:
   each of the root event samples includes a time parameter and a coordinate location parameter,
   each of the canvas image frames includes a time parameter, thereby corresponding in time with one of the root event samples, and
   the parametric difference corresponds to at least one response distance between the coordinate location of a root event sample and a coordinate location of a visual response in a canvas image frame corresponding in time to the root event sample.

7. The system of claim 6, wherein:
the test analysis unit is further executable to detect a coordinate location of a predefined response image template within an image frame, and
the test analysis unit determines the coordinate location of the visual response in the image frame to be the image template coordinate location.

8. The system of claim 6, wherein:
the test analysis unit includes a composite image generator executable to generate composite image frames each displaying one of the canvas image frames and a root sample signifier, the root sample signifier displayed at the coordinate location of the root event sample corresponding in time with the canvas image frame, the composite image frame having a time parameter corresponding with the time parameter of the canvas image frame,
the test analysis unit is further executable to detect a predefined response image template within an image frame, and to detect the root sample signifier within an image frame, and
the test analysis unit determines the response distance of a root event sample as a pixel distance, in the composite image frame corresponding in time with the root event sample, between the predefined response image template and the root sample signifier.

9. The system of claim 6, wherein the degree of visual responsiveness is determined to be below a benchmark responsiveness if the response distance exceeds a predefined threshold distance for at least a predefined threshold number of image frames.

10. The system of claim 6, wherein the degree of visual responsiveness is determined to be below a benchmark responsiveness if the response distance exceeds a predefined threshold distance in each canvas image frame of a consecutive subseries of the series of canvas image frames where the consecutive subseries is longer than a predefined threshold number.

11. The system of claim 1, wherein:
each of the root event samples includes a time parameter and a coordinate location parameter,
each of the canvas image frames includes a time parameter, thereby corresponding in time with one of the root event samples, and
the parametric difference corresponds to a number or ratio of canvas image frames for which an expected visual response of a root event sample was not present in a canvas image frame corresponding in time to the root event sample, for at least a subset of the captured root event samples.

12. A benchmark test system for testing user interface software for time lag in actuating a visual prompt responsive to user manipulation of a user input device, the system comprising:
a display unit defining a canvas for displaying image frames;
an input event recorder executable to record user actuation of the user input device as at least one input event at a root software level, an operating system operating at the root software level, each input event being recorded as a series of time-displaced samples of input device actuation;
an interface response recorder executable to record a processing of the root input event by the user interface software as an interface response at a canvas software level, the user interface software operating at the canvas software level for user interaction with an application, the interface response being recorded as a series of time-displaced image frames; and,
a test analysis unit coupled to said input event and interface response recorders, said test analysis unit executable to compute at least one of a response time difference and a response distance between corresponding ones of the input event samples and interface response image frames, and to determine a degree of visual responsiveness for the user interface software based thereon, said test analysis unit thereby discriminating portions of the time lag introduced at the canvas software level from portions of the time lag introduced at the root software level.

13. A method of testing user interface software for time lag in actuating a visual prompt responsive to user manipulation of a user input device, the method comprising:
recording user actuation of the user input device as at least one root event at a root software level, an operating system operating at the root software level, each root event being recorded as a series of time-displaced samples of input device actuation;
recording a processing of the root event by the user interface software as a canvas response at a canvas software level, the user interface software operating at the canvas software level for user interaction with an application, the canvas response being recorded as a series of time-displaced image frames;
computing a parametric difference between corresponding ones of the root events and canvas responses; and
determining a degree of visual responsiveness for the user interface software based upon the parametric difference, thereby discriminating portions of the time lag introduced at the canvas software level from portions of the time lag introduced at the root software level.

14. The method of claim 1, wherein:
each of the canvas image frames includes a time parameter,
the parametric difference corresponds to a response time difference between a start time of the input device actuation and a visual start time of the canvas response, and
the parametric difference computation includes:
computing a pixel intensity of an initial canvas image frame and at least one other of the canvas response image frames, the initial canvas image frame having a time corresponding in time to the start time of the input device actuation, and
determining the visual start time to be the time of the other image frame if a difference in pixel intensity between the initial canvas image frame and the other image frame exceeds a predefined intensity difference threshold.

15. The method of claim 13, wherein:
each of the canvas image frames includes a time parameter,
the parametric difference corresponds to a response time difference between a start time of the input device actuation and a visual start time of the canvas response, and
the parametric difference computation includes:
detecting a predefined response image template within at least one of the canvas image frames, and
determining the visual start time to be the time of the canvas image frame containing the predefined response image template.

16. The method of claim 13, wherein:
each of the canvas image frames includes a time parameter,
the parametric difference corresponds to a response time difference between a start time of the input device actuation and a visual start time of the canvas response,
the processing of the root event is recorded for the duration of a predefined time threshold, and
the visual responsiveness determination includes determining the degree of visual responsiveness to be below a benchmark responsiveness if the visual start time of the canvas response is not determined to be a time of any image frame of the series of time-displaced image frames.

17. The method of claim 13, wherein:
each of the root event samples includes a time parameter and a coordinate location parameter,
each of the canvas image frames includes a time parameter, thereby corresponding in time with one of the root event samples, and
the parametric difference corresponds to at least one response distance between the coordinate location of a root event sample and a coordinate location of a visual response in a canvas image frame corresponding in time with the root event sample.

18. The method of claim 17, wherein the parametric difference computation includes detecting a coordinate location of a predefined response image template within at least one canvas image frame, the coordinate location of the visual response in the canvas image frame being the coordinate location of the predefined response image template.

19. The method of claim 17, further comprising generating, for at least one canvas image frame, a composite image frame displaying the canvas image frame and a root sample signifier, the root sample signifier displayed at the coordinate location of the root event sample corresponding with time to the canvas image frame, the composite image frame having a time parameter corresponding with the time parameter of the canvas image frame, wherein the parametric difference computation includes:
detecting a predefined response image template within at least one composite image frame,
detecting the root sample signifier within the at least one composite image frame, and
computing the response distance of a root event sample corresponding in time with the at least one composite image frame as a pixel distance between the predefined response image template and the root sample signifier in the composite image frame.

20. The method of claim 13, wherein:
each of the root event samples includes a time parameter and a coordinate location parameter,
each of the canvas image frames includes a time parameter, thereby corresponding in time with one of the root event samples,
the parametric difference computation includes, for at least a subset of the recorded root event samples:
determining an expected visual response for a root event sample, and
determining if the expected visual response is contained within a canvas image frame corresponding in time to the root event sample, and
the parametric difference corresponds to a number or ratio of canvas image frames for which the expected visual response of a root event sample was not present in a canvas image frame corresponding in time to the root event sample.

* * * * *